(12) United States Patent
Berry et al.

(10) Patent No.: US 6,754,890 B1
(45) Date of Patent: Jun. 22, 2004

(54) METHOD AND SYSTEM FOR USING PROCESS IDENTIFIER IN OUTPUT FILE NAMES FOR ASSOCIATING PROFILING DATA WITH MULTIPLE SOURCES OF PROFILING DATA

(75) Inventors: Robert Francis Berry, Austin, TX (US); Ronald O'Neal Edmark, Austin, TX (US); Riaz Y. Hussain, Austin, TX (US); Frank Eliot Levine, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/460,847

(22) Filed: Dec. 14, 1999

Related U.S. Application Data

(63) Continuation-in-part of application No. 08/989,725, filed on Dec. 12, 1997, now Pat. No. 6,055,492, and a continuation-in-part of application No. 09/052,329, filed on Mar. 31, 1998, now Pat. No. 6,002,872, and a continuation-in-part of application No. 09/052,331, filed on Mar. 31, 1998, now Pat. No. 6,158,024, and a continuation-in-part of application No. 09/177,031, filed on Oct. 22, 1998, now Pat. No. 6,311,325, and a continuation-in-part of application No. 09/343,439, filed on Jun. 30, 1999, now Pat. No. 6,553,564, and a continuation-in-part of application No. 09/343,438, filed on Jun. 30, 1999, now Pat. No. 6,513,155.

(51) Int. Cl.[7] .............................................. G06F 9/44

(52) U.S. Cl. ...................................................... 717/128

(58) Field of Search ................................ 717/127–133, 717/154; 714/45

(56) References Cited

U.S. PATENT DOCUMENTS

| | | | |
|---|---|---|---|
| 4,520,441 A | 5/1985 | Bandoh et al. | 364/200 |
| 4,703,417 A | 10/1987 | Morganti et al. | 364/200 |
| 4,841,439 A | 6/1989 | Nishikawa et al. | 364/200 |
| 4,866,599 A | 9/1989 | Morganti et al. | 364/200 |
| 4,868,738 A | 9/1989 | Kish et al. | 364/200 |
| 5,003,458 A | 3/1991 | Yamaguchi et al. | 364/200 |

(List continued on next page.)

OTHER PUBLICATIONS

International Business Machines; Data Structure and Insertion Algorithm for Representing Asynchronous Occurrences for Visualization by Trace Visualization Tools Using Ghant Charts with Occurance Hierarchies; Jul. 1993; pp. 547–557; IBM Technical Disclosure Bulletin; vol. 36, No. 07.

International Business Machines; Adaptive Trace–Directed Program Restructuring; Feb. 1994; pp. 115–116; IBM Technical Disclosure Bulletin; vol. 37, No 02B.

Curry, TW.; Profiling and Tracing Dynamic Library Usage Via Interposition; 1994; pp. 267–278; Proceedings of the Summer 1994 USENIX Conference.

(List continued on next page.)

Primary Examiner—Wei Y. Zhen
(74) Attorney, Agent, or Firm—Duke W. Yee; Leslie A. Van Leeuwen; Stephen J. Walder, Jr.

(57) ABSTRACT

A method of monitoring execution performance of a program is provided. A process identifier associated with a process within a program is determined, and a trace output file is created for the process such that the file name of the trace output file contains the process identifier. Trace records are generated in response to events within the process. The trace records associated with the process are then written to the trace output file associated with the process. Multiple processes may then be associated with unique trace output files simultaneously. Using this methodology, multiple instances of JVMs may be executing simultaneously, and each JVM may be generating trace records through a profiler. However, the origin of the trace records, as identified by the process identifier, or PID, of the JVM is used to place the trace information into a file that is identified through the use of the same PID.

24 Claims, 15 Drawing Sheets

U.S. PATENT DOCUMENTS

| | | | | |
|---|---|---|---|---|
| 5,047,919 | A | | 9/1991 | Sterling et al. ............. 364/200 |
| 5,168,554 | A | * | 12/1992 | Luke ........................... 715/509 |
| 5,355,487 | A | | 10/1994 | Keller et al. ................. 395/650 |
| 5,611,061 | A | | 3/1997 | Yasuda ........................ 395/591 |
| 5,613,118 | A | | 3/1997 | Heisch et al. ............... 395/709 |
| 5,642,478 | A | * | 6/1997 | Chen et al. .................... 714/45 |
| 5,764,944 | A | | 6/1998 | Hwang et al. ............... 395/417 |
| 5,768,500 | A | | 6/1998 | Agrawal et al. ............ 395/184 |
| 5,862,381 | A | * | 1/1999 | Advani et al. ............... 717/125 |
| 5,940,871 | A | | 8/1999 | Goyal et al. ................. 711/206 |
| 5,948,112 | A | | 9/1999 | Shimada et al. .............. 714/16 |
| 6,002,872 | A | | 12/1999 | Alexander, III et al. .... 395/704 |
| 6,202,199 | B1 | * | 3/2001 | Wygodny et al. ........... 717/125 |
| 6,230,313 | B1 | * | 5/2001 | Callahan et al. ............. 717/128 |
| 6,345,295 | B1 | * | 2/2002 | Beardsley et al. .......... 709/224 |
| 6,367,036 | B1 | * | 4/2002 | Hansen ......................... 714/45 |
| 6,546,548 | B1 | * | 4/2003 | Berry et al. ................ 717/128 |

OTHER PUBLICATIONS

International Business Machines; Application of Interpreter for Debugging Functions; Sep. 1993; pp. 67–68; IBM Technical Disclosure Bulletin; vol. 36 No 09B.

Hall et al.; Call Path Profiling Of Monotonic Program Resources in UNIX; Jun. 25, 1993; pp 1–13.

Ammous et al.; Exploring Hardware Performance Counters With Flow And Context Sensitive Profiling; pp 85–96.

Bell et al.; Optimally Profiling and Tracing Programs; Jul. 1994; pp 1319–1360.

* cited by examiner

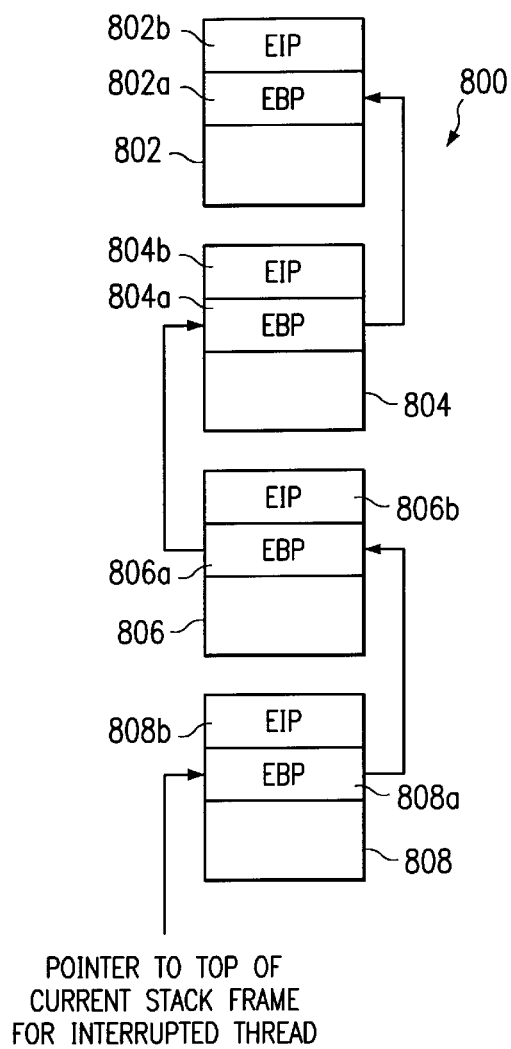
FIG. 8
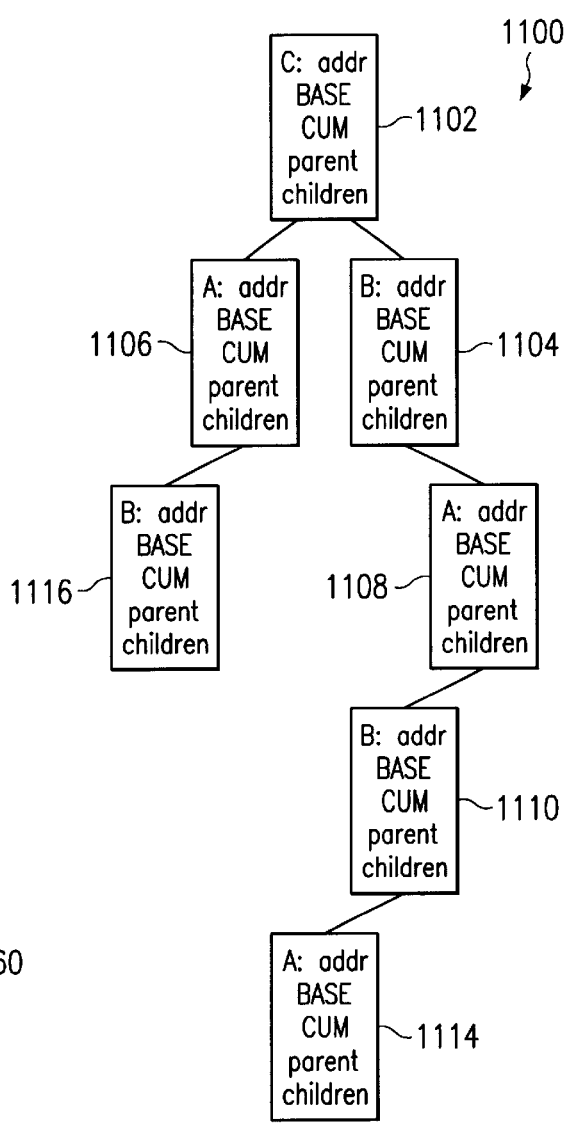
FIG. 9
FIG. 11A
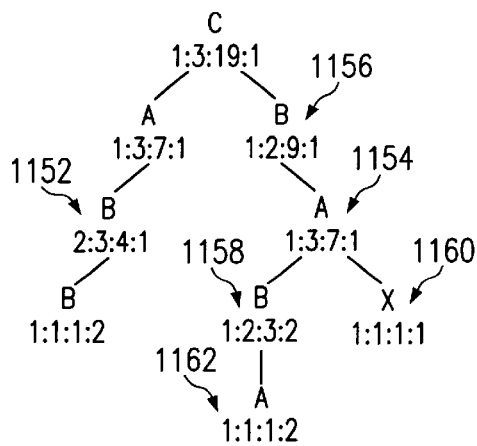
FIG. 11B

| TIMESTAMP | EVENT | CALL STACK AFTER EVENT |
|---|---|---|
| 0 | ENTER C | C |
| 1 | ENTER A | CA |
| 2 | ENTER B | CAB |
| 3 | EXIT FROM B | CA |
| 4 | ENTER B | CAB |
| 5 | ENTER B | CABB |
| 6 | EXIT FROM B | CAB |
| 7 | EXIT FROM B | CA |
| 8 | EXIT FROM A | C |
| 9 | ENTER B | CB |
| 10 | ENTER A | CBA |
| 11 | ENTER B | CBAB |
| 12 | ENTER A | CBABA |
| 13 | EXIT FROM A | CBAB |
| 14 | EXIT FROM B | CBA |
| 15 | ENTER X | CBAX |
| 16 | EXIT FROM X | CBA |
| 17 | EXIT FROM A | CB |
| 18 | EXIT FROM B | C |
| 19 | EXIT FROM C | |

*FIG. 10A*

| SAMPLE | CALL STACK @ SAMPLE |
|---|---|
| 1 | C |
| 2 | CAB |
| 3 | CAB |
| 4 | CAB |
| 5 | C |
| 6 | CBA |
| 7 | CBABA |
| 8 | CBA |
| 9 | CBA |
| 10 | C |

*FIG. 10B*

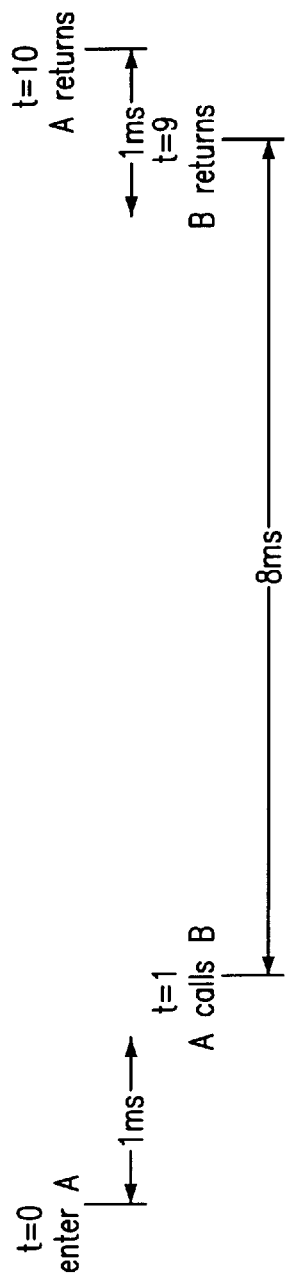
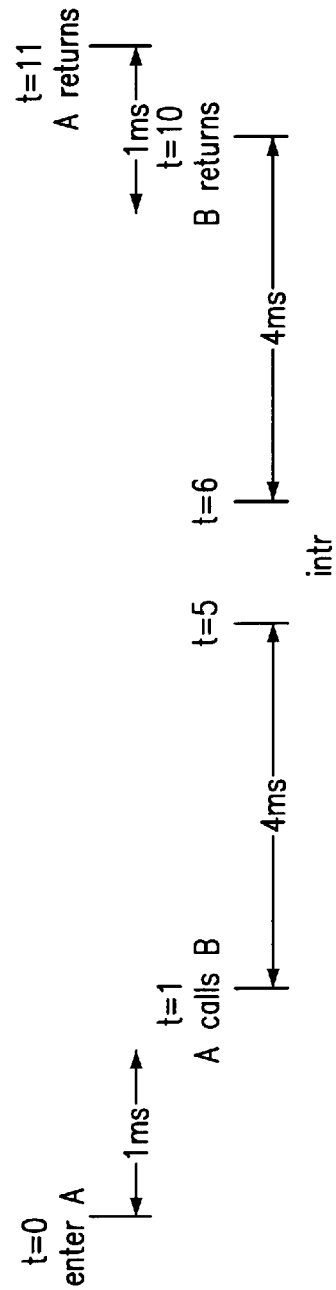
FIG. 10C
FIG. 10D

FIG. 12

| LEVEL | RL | CALLS | BASE | CUM | INDENT |
|---|---|---|---|---|---|
| 0 | 1 | 1 | 0 | 19 | pt_pidtid |
| 1 | 1 | 1 | 3 | 19 | -C |
| 2 | 1 | 1 | 3 | 7 | --A |
| 3 | 1 | 2 | 3 | 4 | ---B |
| 4 | 2 | 1 | 1 | 1 | ----B |
| 2 | 1 | 1 | 2 | 9 | --B |
| 3 | 1 | 1 | 3 | 7 | ---A |
| 4 | 2 | 1 | 2 | 3 | ----B |
| 5 | 2 | 1 | 1 | 1 | -----A |
| 4 | 1 | 1 | 1 | 1 | ----X |

1230 LEVEL, 1232 RL, 1234 CALLS, 1236 BASE, 1238 CUM, 1240 INDENT

FIG. 15

| SAMPLE NUMBER | CALL STACK |
|---|---|
| 1 | Main \| X() \| a() \| f3() |
| 2 | Main \| Y() \| a() \| f4() |
| 3 | Main \| X() \| b() \| a() \| f3() |
| 4 | Main \| X() \| Y() \| a() \| f0() |

1502 SAMPLE NUMBER, 1504 CALL STACK, 1500

FIG. 16

| CALLS | BASE | CUM | NAME |
|---|---|---|---|
| 1 | 0 | 19 | pt_pit.tid |
| 1 | 3 | 19 | C |
| 3 | 7 | 14 | A |
| 5 | 8 | 13 | B |
| 1 | 1 | 1 | X |

1604 CALLS, 1606 BASE, 1608 CUM, 1612 NAME, 1600

ArcFlow Output

Base — Time/Instructions directly in function
Cum — Time/Instructions directly & indirectly in function ArcFlow Invarients:
1) Sum(Parent(Calls)) = Self(Calls)
2) Sum(Parent(Base)) = Self(Base)
3) Sum(Parent(Cum)) = Self(Cum)
4) Sum(Child(Cum)) = Self(Cum)−Self(Base)

| Source | Calls | Base | Cum | Function |
|---|---|---|---|---|
| Self | 1 | 0 | 19 | [0] pt_pidtid |
| Child | 1 | 3 | 19 | C |
| Parent | 1 | 3 | 19 | pt_pidtid |
| Self | 1 | 3 | 19 | [1] C |
| Child | 1 | 2 | 9 | B |
| Child | 1 | 3 | 7 | A |
| Parent | 1 | 3 | 7 | C |
| Parent | 1 | 3 | 7 | B |
| rParent | 1 | 1 | 1 | B |
| Self | 3 | 7 | 14 | [2] A |
|  |  |  | 15 |  |
| Child | 3 | 5 | 7 | B |
| Child | 1 | 1 | 1 | X |
| Parent | 2 | 3 | 4 | A |
| rParent | 1 | 2 | 3 | A |
| Parent | 1 | 2 | 9 | C |
| Self | 5 | 8 | 13 | [3] B |
|  |  |  | 17 |  |
| Child | 1 | 3 | 7 | A |
| rChild | 1 | 1 | 1 | A |
| Child | 1 | 1 | 1 | B |
| Parent | 1 | 1 | 1 | A |
| Self | 1 | 1 | 1 | [4] X |

*FIG. 17*

```
Units : : Ticks                              1800
Total : :       342

LvL  RL   Calls   Base   Cum   Indent  Name
 1    1      1      0    342   -  _Thread-21__( 0xe0046618 )
 2    1      3      0    342   --  J:nulltestScore ()I
 3    1      2      0    272   ---  J:nulltestMilliseconds (I) I
 4    1  29450      0    271   ----  J:nullexecute () I
 5    1    271      0    271   ----+  stack_0x40       ←1802
 6    1    271      0    271   ----+-  F:ExecuteJava
 7    1    271      0    271   ----+--  F:jit_invokeCompiledEntryMethod
 8    1    271      0    271   ----+---  F:_jit_invokeentry
 9    1    271      0    271   ----+----  F:JITInvokeCompiledEntryMethod_md
10    1    271      0    271   ----+----+  J:nullrun () V
11    2    271      0    271   ----+----+-  J:nulltestScore () I
12    2    271      0    271   ----+----+--  J:nulltestMilliseconds (I) I        }1806
13    2    271    268    271   ----+----+---  J:nullexecute () I
14    1      2      0      2   ----+----+----  F:jperf_methodEntry
15    1      2      0      2   ----+----+----+  F:SoftTracehook
16    1      2      2      2   ----+----+----+-  F:enable_interrupts
14    1      1      1      1   ----+----+----  F:jperf_methodExit
 4    1      1      0      1   ----  stack_0x40  ←1804
 5    1      1      0      1   ----+  F:ExecuteJava
 6    1      1      0      1   ----+-  F:jit_invokeCompiledEntryMethod
 7    1      1      0      1   ----+--  F:_jit_invokeentry
 8    1      1      0      1   ----+---  F:JITInvokeCompiledEntryMethod_md
 9    1      1      0      1   ----+----  J:nullrun () V
10    2      1      0      1   ----+----+  J:nulltestScore () I              }1808
11    2      1      0      1   ----+----+-  J:nulltestMilliseconds (I) I
12    1      1      0      1   ----+----+--  J:nullexecute () I
13    1      1      0      1   ----+----+---  F:jperf_methodExit
14    1      1      0      1   ----+----+----  F:SoftTracehook
15    1      1      1      1   ----+----+----+  F:enable_interrupts
 4    1      2      0      0   ----  J:nullcleanUp () I
```

| MAJOR CODE | MINOR CODE | DATA ITEM 1 | DATA ITEM 2 | DATA ITEM 3 | DATA ITEM 4 | DATA ITEM 5 | DESCRIPTION |
|---|---|---|---|---|---|---|---|
| 0x4 | LEVEL + 0x1 | DEPTH | N/A | N/A | N/A | | BEGIN INTERRUPT AT LEVEL |
| 0x4 | LEVEL + 0x80000001 | DEPTH | N/A | N/A | N/A | | END INTERRUPT AT LEVEL |
| 0x10 | 0xab | SYSTEM TID | JAVA TID | IS SYSTEM THREAD (BOOLEAN) | N/A | | THREAD CREATED WITHOUT A NAME WHILE TRACE ACTIVE |
| 0x10 | 0xac | SYSTEM TID | N/A | N/A | N/A | | IDENTIFIES THE IDLE THREAD |
| 0x10 | 0xad | SYSTEM TID | N/A | N/A | N/A | | IDENTIFIES THE GARBAGE COLLECTION THREAD |
| 0x10 | 0xae | SYSTEM TID | JAVA TID | THREAD NAME | N/A | | THREAD CREATED WITH A NAME WHILE TRACE ACTIVE |
| 0x30 | 0x10 | OBJECT ID | METHOD BLOCK ADDRESS | N/A | N/A | | METHOD INVOCATION (INTERPRETED) |
| 0x30 | 0x10 + 0x80000000 | OBJECT ID | METHOD BLOCK ADDRESS | N/A | N/A | | METHOD EXIT (INTERPRETED) |
| 0x40 | 0x7fffffff | NUMBER (N) OF STACK UNWINDS AT TIMER INTERRUPT | PC1-PROGRAM COUNTER OF INTERRUPTED ROUTINE | PC2-CALLER OF INTERRUPTED ROUTINE | ........ | PCN-1 OF N-2ND CALLER OF INTERRUPTED ROUTINE | PCN OF N-1ST CALLER OF INTERRUPTED ROUTINE |
| 0x41 | 0x7fffffff | NUMBER (N) OF STACK UNWINDS AT INSTRUMENTED ROUTINE | PC1-PROGRAM COUNTER OF INSTRUMENTED ROUTINE | PC2-CALLER OF INSTRUMENTED ROUTINE | ........ | | PCN OF N-1ST CALLER OF INSTRUMENTED ROUTINE |
| 0x50 | 0x10 | OBJECT ID | METHOD BLOCK ADDRESS | N/A | N/A | | METHOD INVOCATION (JITTED) |
| 0x50 | 0x10 + 0x80000000 | OBJECT ID | METHOD BLOCK ADDRESS | N/A | N/A | | METHOD EXIT (JITTED) |

METHOD AND SYSTEM FOR USING PROCESS IDENTIFIER IN OUTPUT FILE NAMES FOR ASSOCIATING PROFILING DATA WITH MULTIPLE SOURCES OF PROFILING DATA

CROSS-REFERENCE TO RELATED APPLICATIONS

This application is a continuation-in-part of the following copending and commonly assigned applications entitled "SYSTEM AND METHOD FOR PROVIDING TRACE INFORMATION REDUCTION", U.S. application Ser. No. 08/989,725, filed on Dec. 12, 1997, now U.S. Pat. No. 6,055,492; "A METHOD AND APPARATUS FOR STRUCTURED PROFILING OF DATA PROCESSING SYSTEMS AND APPLICATIONS", U.S. application Ser. No. 09/052,329, now U.S. Pat. No. 6,002,872, filed on Mar. 31, 1998; "A METHOD AND APPARATUS FOR STRUCTURED MEMORY ANALYSIS OF DATA PROCESSING SYSTEMS AND APPLICATIONS", U.S. application Ser. No. 09/052,331, now U.S. Pat. No. 6,158,024, filed on Mar. 31, 1998; "METHOD AND APPARATUS FOR PROFILING PROCESSES IN A DATA PROCESSING SYSTEM", U.S. application Ser. No. 09/177,031, now U.S. Pat. No. 6,311,325 filed on Oct. 22, 1998; "PROCESS AND SYSTEM FOR MERGING TRACE DATA FOR PRIMARILY INTERPRETED METHODS", U.S. application Ser. No. 09/343,439, now U.S. Pat. No. 6,553,564, filed on Jun. 30, 1999; and "METHOD AND SYSTEM FOR MERGING EVENT-BASED DATA AND SAMPLED DATA INTO POSTPROCESSED TRACE OUTPUT", U.S. application Ser. No. 09/343,438, now U.S. Pat. 6,513,155, filed on Jun. 30, 1999.

BACKGROUND OF THE INVENTION

1. Technical Field

The present invention relates to an improved data processing system and, in particular, to a method and apparatus for optimizing performance in a data processing system. Still more particularly, the present invention provides a method and apparatus for a software program development tool for enhancing performance of a software program through software profiling.

2. Description of Related Art

In analyzing and enhancing performance of a data processing system and the applications executing within the data processing system, it is helpful to know which software modules within a data processing system are using system resources. Effective management and enhancement of data processing systems requires knowing how and when various system resources are being used. Performance tools are used to monitor and examine a data processing system to determine resource consumption as various software applications are executing within the data processing system. For example, a performance tool may identify the most frequently executed modules and instructions in a data processing system, or may identify those modules which allocate the largest amount of memory or perform the most I/O requests. Hardware performance tools may be built into the system or added at a later point in time. Software performance tools also are useful in data processing systems, such as personal computer systems, which typically do not contain many, if any, built-in hardware performance tools.

One known software performance tool is a trace tool. A trace tool may use more than one technique to provide trace information that indicates execution flows for an executing program. One technique keeps track of particular sequences of instructions by logging certain events as they occur, so-called event-based profiling technique. For example, a trace tool may log every entry into, and every exit from, a module, subroutine, method, function, or system component. Alternately, a trace tool may log the requester and the amounts of memory allocated for each memory allocation request. Typically, a time-stamped record is produced for each such event. Corresponding pairs of records similar to entry-exit records also are used to trace execution of arbitrary code segments, starting and completing I/O or data transmission, and for many other events of interest.

In order to improve performance of code generated by various families of computers, it is often necessary to determine where time is being spent by the processor in executing code, such efforts being commonly known in the computer processing arts as locating "hot spots." Ideally, one would like to isolate such hot spots at the instruction and/or source line of code level in order to focus attention on areas which might benefit most from improvements to the code.

Another trace technique involves periodically sampling a program's execution flows to identify certain locations in the program in which the program appears to spend large amounts of time. This technique is based on the idea of periodically interrupting the application or data processing system execution at regular intervals, so-called sample-based profiling. At each interruption, information is recorded for a predetermined length of time or for a predetermined number of events of interest. For example, the program counter of the currently executing thread, which is a process that is part of the larger program being profiled, may be recorded during the intervals. These values may be resolved against a load map and symbol table information for the data processing system at post-processing time, and a profile of where the time is being spent may be obtained from this analysis.

For example, isolating such hot spots to the instruction level permits compiler writers to find significant areas of suboptimal code generation at which they may thus focus their efforts to improve code generation efficiency. Another potential use of instruction level detail is to provide guidance to the designer of future systems. Such designers employ profiling tools to find characteristic code sequences and/or single instructions that require optimization for the available software for a given type of hardware.

In an execution environment in which there are multiple profiling sessions occurring simultaneously, the trace output generated by each of the profiling sessions must be maintained separately. Trace records from one application program must not be allowed to corrupt the execution flows represented in the trace records of the second application program. In the case in which the application programs being profiled are multiple instances of the same program, the origin of the trace records from each application may be quite easily confused.

Therefore, it would be advantageous to provide a system that separately maintains profile or trace information for multiple, simultaneous profiling sessions.

SUMMARY OF THE INVENTION

A method of monitoring execution performance of a program is provided. A process identifier associated with a process within a program is determined, and a trace output file is created for the process such that the file name of the trace output file contains the process identifier. Trace records are generated in response to events within the process. The trace records associated with the process are then written to the trace output file associated with the process. Multiple processes may then be associated with unique trace output files simultaneously. Using this methodology, multiple instances of JVMs may be executing simultaneously, and each JVM may be generating trace records through a profiler. However, the origin of the trace records, as identified by the process identifier of the JVM, is used to place the trace information into a file that is identified through the use of the same process identifier.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a diagram depicting the call stack containing stack frames;

FIG. 9 is an illustration depicting a call stack sample;

FIG. 10A is a diagram depicting a program execution sequence along with the state of the call stack at each function entry/exitpoint;

FIG. 10B is a diagram depicting a particular timer based sampling of the execution flow depicted in FIG. 10A;

FIGS. 10C–D are time charts providing an example of the types of time for which the profiling tool accounts;

FIG. 11A is a diagram depicting a tree structure generated from sampling a call stack;

FIG. 11B is a diagram depicting an event tree which reflects call stacks observed during system execution;

FIG. 12 is a table depicting a call stack tree;

FIG. 15 is a diagram depicting a structured profile obtained using the processes of the present invention;

FIG. 16 is a diagram depicting a record generated using the processes of present invention;

FIG. 17 is a diagram depicting another type of report that may be produced to show the calling structure between routines shown in FIG. 12;

FIG. 18 is a table depicting a report generated from a trace file containing both event-based profiling information (method entry/exits) and sample-based profiling information (stack unwinds);

FIG. 19 is a table depicting major codes and minor codes that may be employed to instrument modules for profiling;

DETAILED DESCRIPTION OF THE PREFERRED EMBODIMENT

Figure 1:
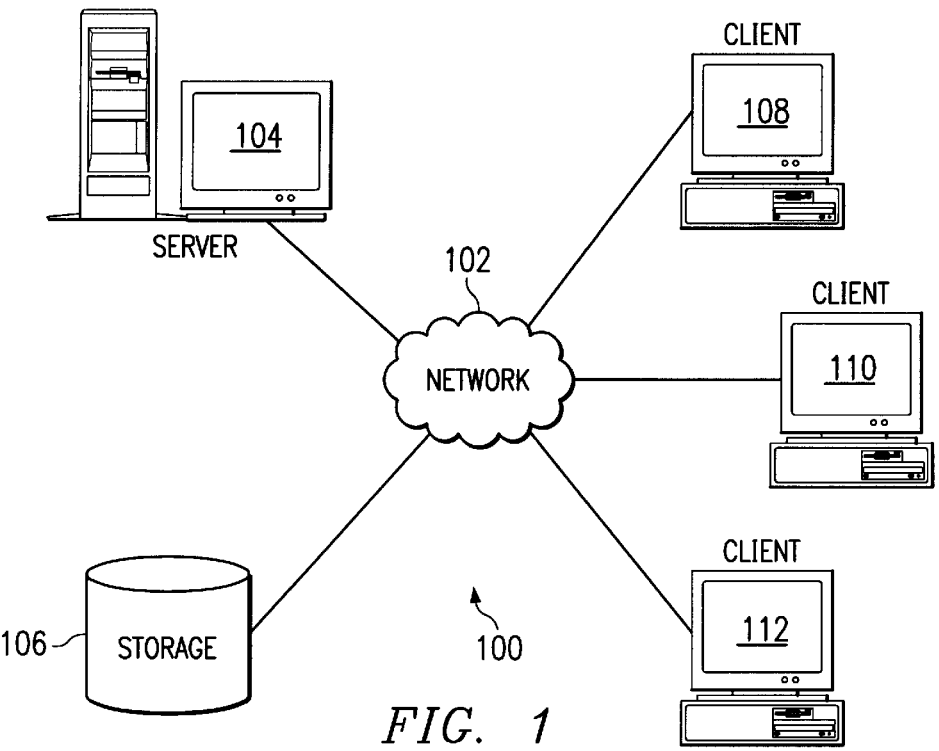
FIG. 1 is an illustration depicting a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

FIG. 1 is intended as an example, and not as an architectural limitation for the processes of the present invention.

Figure 2A:
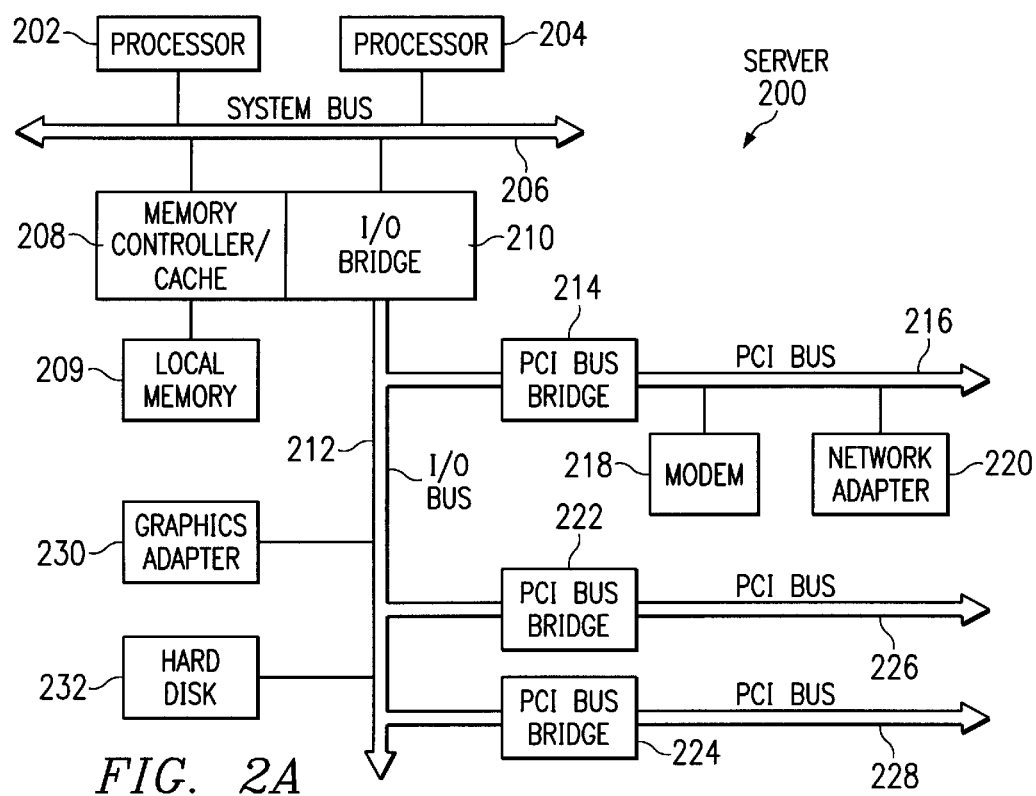
FIGS. 2A–B are block diagrams depicting a data processing system in which the present invention may be implemented.

With reference now to FIG. 2A, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drive and the like also may be used in addition or in place of the hardware depicted. The depicted example is not meant to imply architectural limitations with respect to the present invention.

The data processing system depicted in FIG. 2A may be, for example, an IBM RISC/System 6000 system, a product of International Business Machines Corporation in Armonk, N.Y., running the Advanced Interactive Executive (AIX) operating system.

Figure 2B:
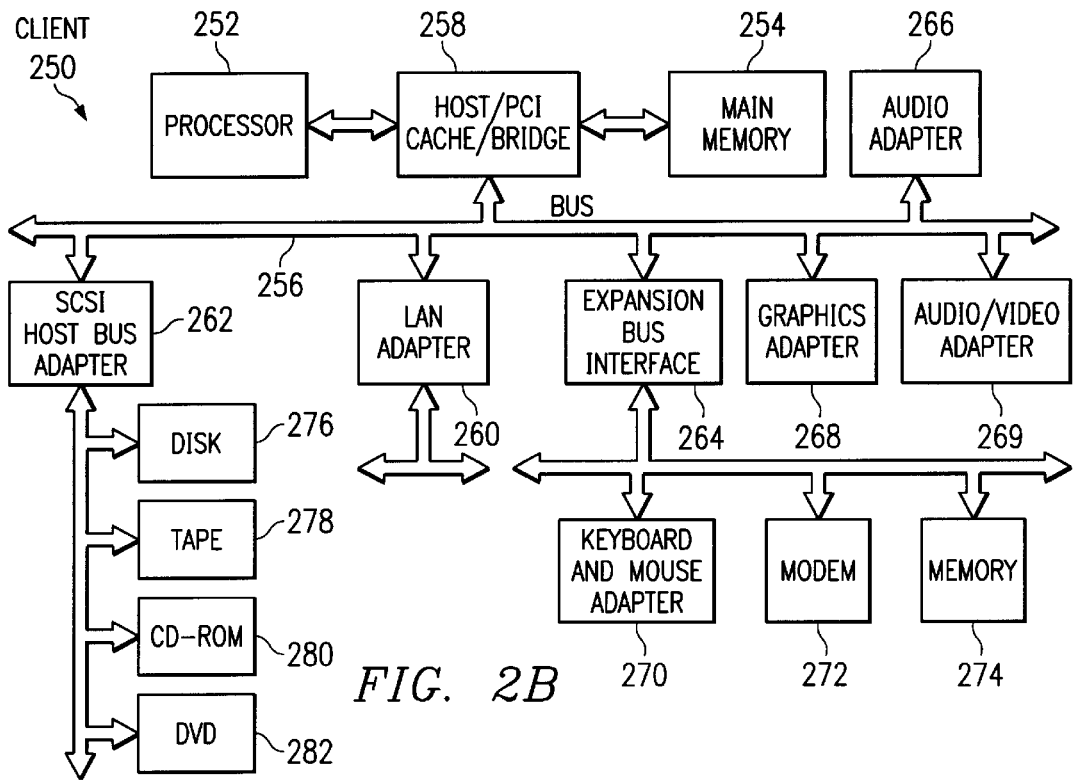

With reference now to FIG. 2B, a block diagram of a data processing system in which the present invention may be implemented is illustrated. Data processing system 250 is an example of a client computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local bus implementations will support three or four PCI expansion slots or add-in connectors.

An operating system runs on processor 252 and is used to coordinate and provide control of various components within data processing system 250 in FIG. 2B. The operating system may be a commercially available operating system such as JavaOS For Business™ or OS/2™, which are available from International Business Machines Corporation™. JavaOS is loaded from a server on a network to a network client and supports Java programs and applets. A couple of characteristics of JavaOS that are favorable for performing traces with stack unwinds, as described below, are that JavaOS does not support paging or virtual memory. An object oriented programming system such as Java may run in conjunction with the operating system and may provide calls to the operating system from Java programs or applications executing on data processing system 250. Instructions for the operating system, the object-oriented operating system, and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. The depicted example is not meant to imply architectural limitations with respect to the present invention. For example, the processes of the present invention may be applied to a multiprocessor data processing system.

The present invention provides a process and system for profiling software applications. Although the present invention may operate on a variety of computer platforms and operating systems, it may also operate within a Java runtime environment. Hence, the present invention may operate in conjunction with a Java virtual machine (JVM) yet within the boundaries of a JVM as defined by Java standard specifications. In order to provide a context for the present invention, portions of the operation of a JVM according to Java specifications are herein described.

Figure 3A:
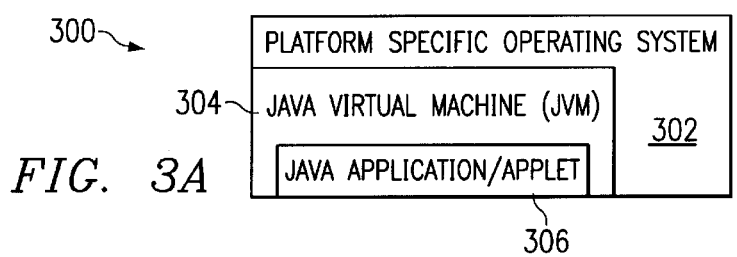
FIG. 3A is a block diagram depicting the relationship of software components operating within a computer system that may implement the present invention.

With reference now to FIG. 3A, a block diagram illustrates the relationship of software components operating within a computer system that may implement the present invention. Java-based system 300 contains platform specific operating system 302 that provides hardware and system support to software executing on a specific hardware platform. JVM 304 is one software application that may execute in conjunction with the operating system. JVM 304 provides a Java run-time environment with the ability to execute Java application or applet 306, which is a program, servlet, or software component written in the Java programming language. The computer system in which JVM 304 operates may be similar to data processing system 200 or computer 100 described above. However, JVM 304 may be implemented in dedicated hardware on a so-called Java chip, Java-on-silicon, or Java processor with an embedded pico-Java core.

At the center of a Java run-time environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code. Byte codes are may be translated into native code by a just-in-time compiler or JIT.

A JVM must load class files and execute the bytecodes within them. The JVM contains a class loader, which loads class-files from an application and the class files from the Java application programming interfaces (APIs) which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the Java bytecodes are executed natively. JVMs usually interpret bytecodes, but JVMs may also use other techniques, such as just-in-time compiling, to execute bytecodes.

Interpreting code provides an additional benefit. Rather than instrumenting the Java source code, the interpreter may be instrumented. Trace data may be generated via selected events and timers through the instrumented interpreter without modifying the source code. Profile instrumentation is discussed in more detail further below.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

Figure 3B:
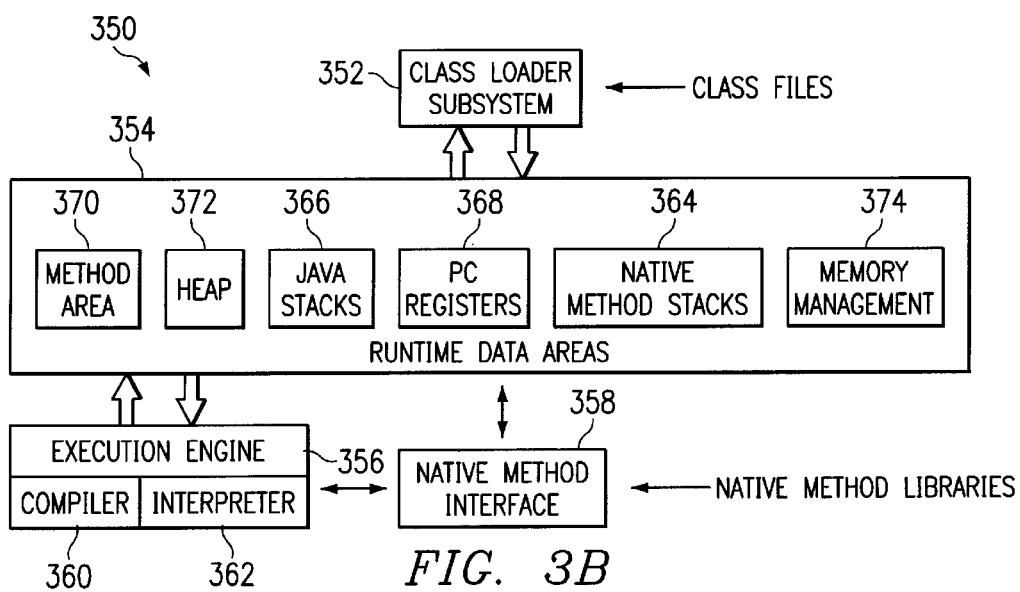
FIG. 3B is a block diagram depicting a Java virtual machine in accordance with a preferred embodiment of the present invention.

With reference now to FIG. 3B, a block diagram of a JVM is depicted in accordance with a preferred embodiment of the present invention. JVM 350 includes a class loader subsystem 352, which is a mechanism for loading types, such as classes and interfaces, given fully qualified names. JVM 350 also contains runtime data areas 354, execution engine 356, native method interface 358, and memory management 374. Execution engine 356 is a mechanism for executing instructions contained in the methods of classes loaded by class loader subsystem 352. Execution engine 356 may be, for example, Java interpreter 362 or just-in-time compiler 360. Native method interface 358 allows access to resources in the underlying operating system. Native method interface 358 may be, for example, a Java native interface.

Runtime data areas 354 contain native method stacks 364, Java stacks 366, PC registers 368, method area 370, and heap 372. These different data areas represent the organization of memory needed by JVM 350 to execute a program.

Java stacks 366 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it. The JVM does not have any registers for holding intermediate values; any Java instruction that requires or produces an intermediate value uses the stack for holding the intermediate values. In this manner, the Java instruction set is well-defined for a variety of platform architectures.

PC registers 368 are used to indicate the next instruction to be executed. Each instantiated thread gets its own pc register (program counter) and Java stack. If the thread is executing a JVM method, the value of the pc register indicates the next instruction to execute. If the thread is executing a native method, then the contents of the pc register are undefined.

Native method stacks 364 store the state of invocations of native methods. The state of native method invocations is stored in an implementation-dependent way in native method stacks, registers, or other implementation-dependent memory areas. In some JVM implementations, native method stacks 364 and Java stacks 366 are combined.

Method area 370 contains class data while heap 372 contains all instantiated objects. The JVM specification strictly defines data types and operations. Most JVMs choose to have one method area and one heap, each of which are shared by all threads running inside the JVM. When the JVM loads a class file, it parses information about a type from the binary data contained in the class file. It places this type information into the method area. Each time a class instance or array is created, the memory for the new object is allocated from heap 372. JVM 350 includes an instruction that allocates memory space within the memory for heap 372 but includes no instruction for freeing that space within the memory. Memory management 374 in the depicted example manages memory space within the memory allocated to heap 370. Memory management 374 may include a garbage collector which automatically reclaims memory used by objects that are no longer referenced. Additionally, a garbage collector also may move objects to reduce heap fragmentation.

The processes within the following figures provide an overall perspective of the many processes employed within the present invention: processes that generate event-based profiling information in the form of specific types of records in a trace file; processes that generate sample-based profiling information in the form of specific types of records in a trace file; processes that read the trace records to generate more useful information to be placed into profile reports; and processes that generate the profile reports for the user of the profiling utility.

Figure 4:
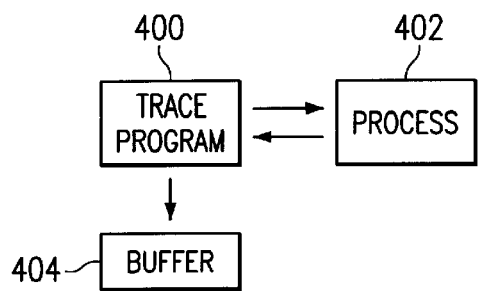
FIG. 4 is a block diagram depicting components used to profile processes in a data processing system.

With reference now to FIG. 4, a block diagram depicts components used to profile processes in a data processing system. A trace program 400 is used to profile processes 402. Trace program 400 may be used to record data upon the execution of a hook, which is a specialized piece of code at a specific location in a routine or program in which other routines may be connected. Trace hooks are typically inserted for the purpose of debugging, performance analysis, or enhancing functionality. These trace hooks are employed to send trace data to trace program 400, which stores the trace data in buffer 404. The trace data in buffer 404 may be stored in a file for post-processing. With Java operating systems, the present invention employs trace hooks that aid in identifying methods that may be used in processes 402. In addition, since classes may be loaded and unloaded, these changes may also be identified using trace data. This is especially relevant with "network client" data processing systems, such as those that may operate under JavaOS, since classes and jitted methods may be loaded and unloaded more frequently due to the constrained memory and role as a network client.

Figure 5:
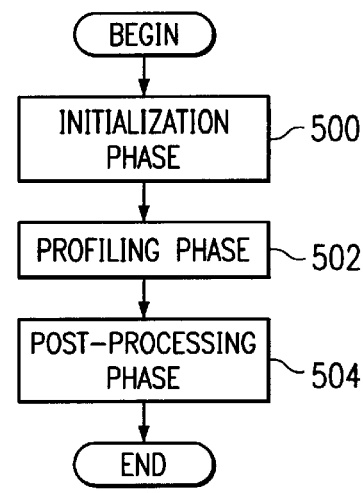
FIG. 5 is an illustration depicting various phases in profiling the active processes in an operating system.

With reference now to FIG. 5, a diagram depicts various phases in profiling the processes active in an operating system. Subject to memory constraints, the generated trace output may be as long and as detailed as the analyst requires for the purpose of profiling a particular program.

An initialization phase 500 is used to capture the state of the client machine at the time tracing is initiated. This trace initialization data includes trace records that identify all existing threads, all loaded classes, and all methods for the loaded classes. Records from trace data captured from hooks are written to indicate thread switches, interrupts, and loading and unloading of classes and jitted methods. Any class which is loaded has trace records that indicate the name of the class and its methods. In the depicted example, four byte IDs are used as identifiers for threads, classes, and methods. These IDs are associated with names output in the records. A record is written to indicate when all of the start up information has been written.

Next, during the profiling phase 502, trace records are written to a trace buffer or file. Trace records may originate from two types of profiling actions—event-based profiling and sample-based profiling. In the present invention, the trace file may have a combination of event-based records, such as those that may originate from a trace hook executed in response to a particular type of event, e.g., a method entry or method exit, and sample-based records, such as those that may originate from a stack walking function executed in response to a timer interrupt, e.g., a stack unwind record, also called a call stack record.

For example, the following process may occur during the profiling phase if the user of the profiling utility has requested sample-based profiling information. Each time a particular type of timer interrupt occurs, a trace record is written, which indicates the system program counter. This system program counter may be used to identify the routine that is interrupted. In the depicted example, a timer interrupt is used to initiate gathering of trace data. Of course, other types of interrupts may be used other than timer interrupts. Interrupts based on a programmed performance monitor event or other types of periodic events may be employed.

In the post-processing phase 504, the data collected in the buffer is sent to a file for post-processing. In one configuration, the file may be sent to a server, which determines the profile for the processes on the client machine. Of course, depending on available resources, the post-processing also may be performed on the client machine. In post-processing phase 504, B-trees and/or hash tables may be employed to maintain names associated the records in the trace file to be processed. A hash table employs hashing to convert an identifier or a key, meaningful to a user, into a value for the location of the corresponding data in the table. While processing trace records, the B-trees and/or hash tables are updated to reflect the current state of the client machine, including newly loaded jitted code or unloaded code. Also, in the post-processing phase 504, each trace record is processed in a serial manner. As soon as the indicator is encountered that all of the startup information has been processed, event-based trace records from trace hooks and sample-based trace records from timer interrupts are then processed. Timer interrupt information from the timer interrupt records are resolved with existing hash tables. In addition, this information identifies the thread and function being executed. The data is stored in hash tables with a count identifying the number of timer tick occurrences associated with each way of looking at the data. After all of the trace records are processed, the information is formatted for output in the form of a report.

Alternatively, trace information may be processed on-the-fly so that trace data structures are maintained during the profiling phase. In other words, while a profiling function, such as a timer interrupt, is executing, rather than (or in addition to) writing trace records to a buffer or file, the trace record information is processed to construct and maintain any appropriate data structures.

For example, during the processing of a timer interrupt during the profiling phase, a determination could be made as to whether the code being interrupted is being interpreted by the Java interpreter. If the code being interrupted is interpreted, the method ID of the method being interpreted may be placed in the trace record. In addition, the name of the method may be obtained and placed in the appropriate B-tree. Once the profiling phase has completed, the data structures may contain all the information necessary for generating a profile report without the need for post-processing of the trace file.

Figure 6:
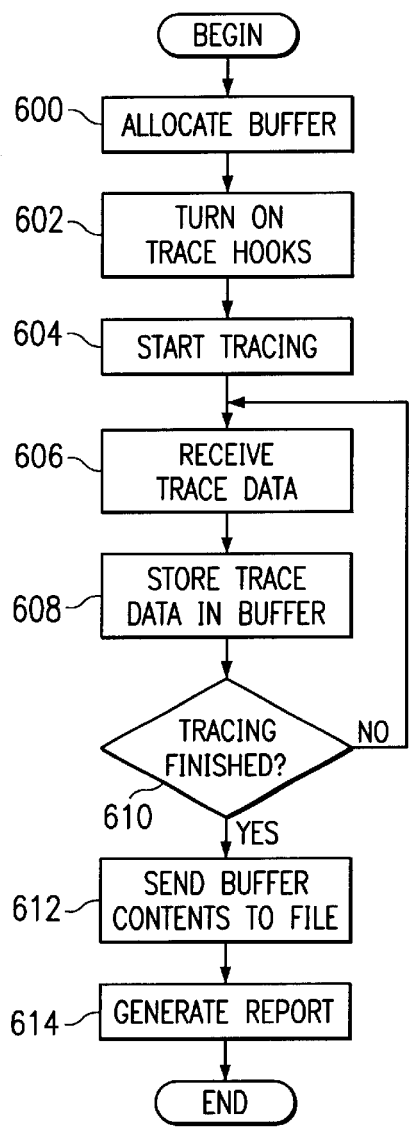
FIG. 6 is a flowchart depicting a process used by a trace program for generating trace records from processes executing on a data processing system.

With reference now to FIG. 6, a flowchart depicts a process used by a trace program for generating trace records from processes executing on a data processing system. FIG. 6 provides further detail concerning the generation of trace records that were not described with respect to FIG. 5.

Trace records may be produced by the execution of small pieces of code called "hooks". Hooks may be inserted in various ways into the code executed by processes, including statically (source code) and dynamically (through modification of a loaded executable). This process is employed after trace hooks have already been inserted into the process or processes of interest. The process begins by allocating a buffer (step 600), such as buffer 404 in FIG. 4. Next, in the depicted example, trace hooks are turned on (step 602), and tracing of the processes on the system begins (step 604). Trace data is received from the processes of interest (step 606). This type of tracing may be performed during phases 500 and/or 502. This trace data is stored as trace records in the buffer (step 608). A determination is made as to whether tracing has finished (step 610). Tracing finishes when the trace buffer has been filled or the user stops tracing via a command and requests that the buffer contents be sent to file. If tracing has not finished, the process returns to step 606 as described above.

Otherwise, when tracing is finished, the buffer contents are sent to a file for post-processing (step 612). A report is then generated in post-processing (step 614) with the process terminating thereafter.

Although the depicted example uses post-processing to analyze the trace records, the processes of the present invention may be used to process trace information in real-time depending on the implementation.

Figure 7:
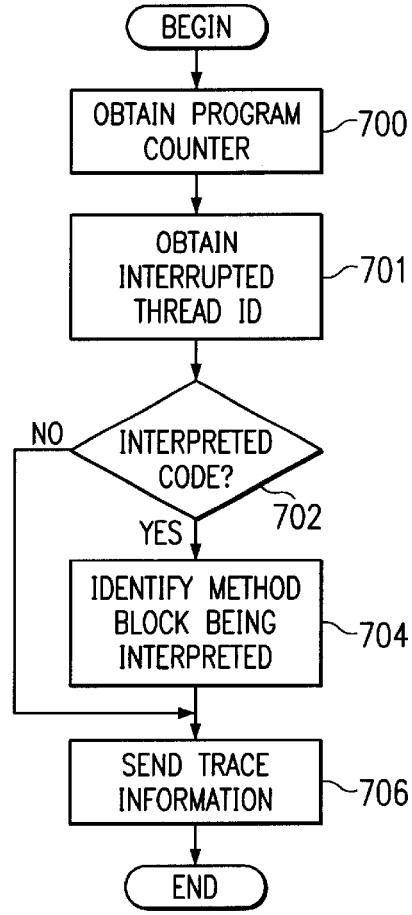
FIG. 7 is a flowchart depicting a process used in a system interrupt handler trace hook.

With reference now to FIG. 7, a flowchart depicts a process that may be used during an interrupt handler trace hook.

The process begins by obtaining a program counter (step 700). Typically, the program counter is available in one of the saved program stack areas. Thereafter, a determination is made as to whether the code being interrupted is interpreted code (step 702). This determination may be made by determining whether the program counter is within an address range for the interpreter used to interpret bytecodes. If the code being interrupted is interpreted, a method block address is obtained for the code being interpreted. A trace record is then written (step 706). The trace record is written by sending the trace information to a trace program, such as trace program 400, which generates trace records for post-processing in the depicted example. This trace record is referred to as an interrupt record, or an interrupt hook.

This type of trace may be performed during phase 502. Alternatively, a similar process, i.e. determining whether code that was interrupted is interpreted code, may occur during post-processing of a trace file.

In addition to event-based profiling, a set of processes may be employed to obtain sample-based profiling information. As applications execute, the applications may be periodically interrupted in order to obtain information about the current runtime environment. This information may be written to a buffer or file for post-processing, or the information may be processed on-the-fly into data structures representing an ongoing history of the runtime environment. FIGS. 8 and 9 describe sample-based profiling in more detail.

A sample-based profiler obtains information from the stack of an interrupted thread. The thread is interrupted by a timer interrupt presently available in many operating systems. The user of the trace facility selects either the program counter option or the stack unwind option, which may be accomplished by enabling one major code or another major code, as described further below. This timer interrupt is employed to sample information from a call stack. By walking back up the call stack, a complete call stack can be obtained for analysis. A "stack walk" may also be described as a "stack unwind", and the process of "walking the stack" may also be described as "unwinding the stack." Each of these terms illustrates a different metaphor for the process. The process can be described as "walking" as the process must obtain and process the stack frames step-by-step. The process may also be described as "unwinding" as the process must obtain and process the stack frames that point to one another, and these pointers and their information must be "unwound" through many pointer dereferences.

The stack unwind follows the sequence of functions/method calls at the time of the interrupt. A call stack is an ordered list of routines plus offsets within routines (i.e. modules, functions, methods, etc.) that have been entered during execution of a program. For example, if routine A calls routine B, and then routine B calls routine C, while the processor is executing instructions in routine C, the call stack is ABC. When control returns from routine C back to routine B, the call stack is AB. For more compact presentation and ease of interpretation within a generated report, the names of the routines are presented without any information about offsets. Offsets could be used for more detailed analysis of the execution of a program, however, offsets are not considered further herein.

Thus, during timer interrupt processing or at post-processing, the generated sample-based profile information reflects a sampling of call stacks, not just leaves of the possible call stacks, as in some program counter sampling techniques. A leaf is a node at the end of a branch, i.e. a node that has no descendants. A descendant is a child of a parent node, and a leaf is a node that has no children.

With reference now FIG. 8, a diagram depicts the call stack containing stack frames. A "stack" is a region of reserved memory in which a program or programs store status data, such as procedure and function call addresses, passed parameters, and sometimes local variables. A "stack frame" is a portion of a thread's stack that represents local storage (arguments, return addresses, return values, and local variables) for a single function invocation. Every active thread of execution has a portion of system memory allocated for its stack space. A thread's stack consists of sequences of stack frames. The set of frames on a thread's stack represent the state of execution of that thread at any time. Since stack frames are typically interlinked (e.g., each stack frame points to the previous stack frame), it is often possible to trace back up the sequence of stack frames and develop the "call stack". A call stack represents all not-yet-completed function calls—in other words, it reflects the function invocation sequence at any point in time.

Call stack 800 includes information identifying the routine that is currently running, the routine that invoked it, and so on all the way up to the main program. Call stack 800 includes a number of stack frames 802, 804, 806, and 808. In the depicted example, stack frame 802 is at the top of call stack 800, while stack frame 808 is located at the bottom of call stack 800. The top of the call stack is also referred to as the "root". The timer interrupt (found in most operating systems) is modified to obtain the program counter value (pcv) of the interrupted thread, together with the pointer to the currently active stack frame for that thread. In the Intel architecture, this is typically represented by the contents of registers: EIP (program counter) and EBP (pointer to stack frame). By accessing the currently active stack frame, it is possible to take advantage of the (typical) stack frame linkage convention in order to chain all of the frames together. Part of the standard linkage convention also dictates that the function return address be placed just above the invoked-function's stack frame; this can be used to ascertain the address for the invoked function. While this discussion employs an Intel-based architecture, this example is not a restriction. Most architectures employ linkage conventions that can be similarly navigated by a modified profiling interrupt handler.

When a timer interrupt occurs, the first parameter acquired is the program counter value. The next value is the pointer to the top of the current stack frame for the interrupted thread. In the depicted example, this value would point to EBP 808a in stack frame 808. In turn, EBP 808 points to EBP 806a in stack frame 806, which in turn points to EBP 804a in stack frame 804. In turn, this EBP points to EBP 802a in stack frame 802. Within stack frames 802–808 are EIPs 802b—808b, which identify the calling routine's return address. The routines may be identified from these addresses. Thus, routines are defined by collecting all of the return addresses by walking up or backwards through the stack.

With reference now to the FIG. 9, an illustration of a call stack is depicted. A call stack, such as call stack 900 is obtained by walking the call stack. A call stack is obtained each time a periodic event, such as, for example, a timer interrupt occurs. These call stacks may be stored as call stack unwind trace records within the trace file for post-processing or may be processed on-the-fly while the program continues to execute.

In the depicted example, call stack 900 contains a pid 902, which is the process identifier, and a tid 904, which is the thread identifier. Call stack 900 also contains addresses addr1 906, addr2 908 . . . addrN 910. In this example, addr1 906 represents the value of the program counter at the time of the interrupt. This address occurs somewhere within the scope of the interrupted function. addr2 908 represents an address within the process that called the function that was interrupted. For Intel-processor-based data processing systems, it represents the return address for that call; decrementing that value by 4 results in the address of the actual call, also known as the call-site. This corresponds with EIP 808b in FIG. 8; addrN 910 is the top of the call stack (EIP 802b). The call stack that would be returned if the timer interrupt interrupted the thread whose call stack state is depicted in FIG. 8 would consist of: a pid, which is the process id of the interrupted thread; a tid, which is the thread id for the interrupted thread; a pcv, which is a program counter value (not shown on FIG. 8) for the interrupted thread; EIP 808b; EIP 806b; EIP 804b; and EIP 802b. In terms of FIG. 9, pcv=addr1, EIP 808b=addr2, EIP 806b= addr3, EIP 804b=addr4, EIP 802b=addr5.

With reference now to FIG. 10A, a diagram of a program execution sequence along with the state of the call stack at each function entry/exit point is provided. The illustration shows entries and exits occurring at regular time intervals, but this is only a simplification for the illustration. If each function (A, B, C, and X in the figure) were instrumented with entry/exit event hooks, then complete accounting of the time spent within and below each function would be readily obtained. Note in FIG. 10A that at time 0, the executing thread is in routine C. The call stack at time 0 is C. At time 1, routine C calls routine A, and the call stack becomes CA and so on. It should be noted that the call stack in FIG. 10A is a reconstructed call stack that is generated by processing the event-based trace records in a trace file to follow such events as method entries and method exits.

The accounting technique and data structure are described in more detail further below. Unfortunately, this type of instrumentation can be expensive, can introduce bias, and in some cases, can be hard to apply. Sample-based profiling, by sampling the program's call stack, helps to alleviate the performance bias (and other complications) that entry/exit hooks produce.

Consider FIG. 10B, in which the same program is executed but is being sampled on a regular basis (in the example, the interrupt occurs at a frequency equivalent to two timestamp values). Each sample includes a snapshot of the interrupted thread's call stack. Not all call stack combinations are seen with this technique (note that routine X does not show up at all in the set of call stack samples in FIG. 10B). This is an acceptable limitation of sampling. The idea is that with an appropriate sampling rate (e.g., 30–1000 times per second), the call stacks in which most of the time is spent will be identified. Although some call stacks are omitted, it is a minor issue provided these call stacks are combinations for which little time is consumed.

In the event-based traces, there is a fundamental assumption that the traces contain information about routine entries and matching routine exits. Often, entry-exit pairs are nested in the traces because routines call other routines. Time spent (or memory consumed) between entry into a routine and exit from the same routine is attributed to that routine, but a user of a profiling tool may want to distinguish between time spent directly in a routine and time spent in other routines that it calls.

FIG. 10C shows an example of the manner in which time may be expended by two routines: a program's "main" calls routine A at time "t" equal to zero; routine A computes for 1 ms and then calls routine B; routine B computes for 8 ms and then returns to routine A; routine A computes for 1 ms and then returns to "main". From the point of view of "main", routine A took 10 ms to execute, but most of that time was spent executing instructions in routine B and was not spent executing instructions within routine A. This is a useful piece of information for a person attempting to optimize the example program. In addition, if routine B is called from many places in the program, it might be useful to know how much of the time spent in routine B was on behalf of (or when called by) routine A and how much of the time was on behalf of other routines.

A fundamental concept in the output provided by the methods described herein is the call stack. The call stack consists of the routine that is currently running, the routine that invoked it, and so on all the way up to main. A profiler may add a higher, thread level with the pid/tid (the process IDs and thread IDs). In any case, an attempt is made to follow the trace event records, such as method entries and exits, as shown in FIG. 10A, to reconstruct the structure of the call stack frames while the program was executing at various times during the trace.

The post-processing of a trace file may result in a report consisting of three kinds of time spent in a routine, such as routine A: (1) base time—the time spent executing code in routine A itself; (2) cumulative time (or "cum time" for short)—the time spent executing in routine A plus all the time spent executing every routine that routine A calls (and all the routines they call, etc.); and (3) wall-clock time or elapsed time. This type of timing information may be obtained from event-based trace records as these records have timestamp information for each record.

A routine's cum time is the sum of all the time spent executing the routine plus the time spent executing any other routine while that routine is below it on the call stack. In the example above in FIG. 10C, routine A's base time is 2 ms, and its cum time is 10 ms. Routine B's base time is 8 ms, and its cum time is also 8 ms because it does not call any other routines. It should be noted that cum time may not be generated if a call stack tree is being generated on-the-fly—cum time may only be computed after the fact during the post-processing phase of a profile utility.

For wall-clock or elapsed time, if while routine B was running, the system fielded an interrupt or suspended this thread to run another thread, or if routine B blocked waiting on a lock or I/O, then routine B and all the entries above routine B on the call stack accumulate elapsed time but not base or cum time. Base and cum time are unaffected by interrupts, dispatching, or blocking. Base time only increases while a routine is running, and cum time only increases while the routine or a routine below it on the call stack is running.

In the example in FIG. 10C, routine A's elapsed time is the same as its cum time—10 ms. Changing the example slightly, suppose there was a 1 ms interrupt in the middle of B, as shown in FIG. 10D. Routine A's base and cum time are unchanged at 2 ms and 10 ms, but its elapsed time is now 11 ms.

Although base time, cum time and elapsed time were defined in terms of processor time spent in routines, sample based profiling is useful for attributing consumption of almost any system resource to a set of routines, as described in more detail below with respect to FIG. 11B. Referring to FIG. 10C again, if routine A initiated two disk I/O's, and then routine B initiated three more I/O's when called by routine A, routine A's "base I/O's" are two and routine A's "cum I/O's" are five. "Elapsed I/O's" would be all I/O's, including those by other threads and processes, that occurred between entry to routine A and exit from routine A. More general definitions for the accounting concepts during profiling would be the following: base—the amount of the tracked system resource consumed directly by this routine; cum—the amount of the tracked system resource consumed by this routine and all routines below it on the call stack; elapsed—the total amount of the tracked system resource consumed (by any routine) between entry to this routine and exit from the routine.

As noted above, FIGS. 10A–10D describe the process by which a reconstructed call stack may be generated by processing the event-based trace records in a trace file by following such events as method entries and method exits. Hence, although FIGS. 11A–14 describe call stack trees that may be applicable to processing sample-based trace records, the description below for generating or reconstructing call stacks and call stack trees in FIGS. 11A–14 is mainly directed to the processing of event-based trace records.

With reference now to FIG. 11A, a diagram depicts a tree structure generated from trace data. This figure illustrates a call stack tree 1100 in which each node in tree structure 1100 represents a function entry point.

Additionally, in each node in tree structure 1100, a number of statistics are recorded. In the depicted example, each node, nodes 1102–1108, contains an address (addr), a base time (BASE), cumulative time (CUM) and parent and children pointers. As noted above, this type of timing information may be obtained from event-based trace records as these records have timestamp information for each record. The address represents a function entry point. The base time represents the amount of time consumed directly by this thread executing this function. The cumulative time is the amount of time consumed by this thread executing this function and all functions below it on the call stack. In the depicted example, pointers are included for each node. One pointer is a parent pointer, a pointer to the node's parent. Each node also contains a pointer to each child of the node.

Those of ordinary skill in the art will appreciate that tree structure 1100 may be implemented in a variety of ways and that many different types of statistics may be maintained at the nodes other than those in the depicted example.

The call stack is developed from looking back at all return addresses. These return addresses will resolve within the bodies of those functions. This information allows for accounting discrimination between distinct invocations of the same function. In other words, if function X has 2 distinct calls to function A, the time associated with those calls can be accounted for separately. However, most reports would not make this distinction.

With reference now to FIG. 11B, a call stack tree which reflects call stacks observed during a specific example of system execution will now be described. At each node in the tree, several statistics are recorded. In the example shown in FIG. 11B, the statistics are time-based statistics. The particular statistics shown include the number of distinct times the call stack is produced, the sum of the time spent in the call stack, the total time spent in the call stack plus the time in those call stacks invoked from this call stack (referred to as cumulative time), and the number of instances of this routine above this instance (indicating depth of recursion).

For example, at node 1152 in FIG. 11B, the call stack is CAB, and the statistics kept for this node are 2:3:4:1. Note that call stack CAB is first produced at time 2 in FIG. 10A, and is exited at time 3. Call stack CAB is produced again at time 4, and is exited at time 7. Thus, the first statistic indicates that this particular call stack, CAB, is produced twice in the trace. The second statistic indicates that call stack CAB exists for three units of time (at time 2, time 4, and time 6). The third statistic indicates the cumulative amount of time spent in call stack CAB and those call stacks invoked from call stack CAB (i.e., those call stacks having CAB as a prefix, in this case CABB). The cumulative time in the example shown in FIG. 11B is four units of time. Finally, the recursion depth of call stack CAB is one, as none of the three routines present in the call stack have been recursively entered.

Those skilled in the art will appreciate that the tree structure depicted in FIG. 11B may be implemented in a variety of ways, and a variety of different types of statistics may be maintained at each node. In the described embodiment, each node in the tree contains data and pointers. The data include the name of the routine at that node, and the four statistics discussed above. Of course, many other types of statistical information may be stored at each node. In the described embodiment, the pointers for each node include a pointer to the node's parent, a pointer to the first child of the node (i.e. the left-most child), a pointer to the next sibling of the node, and a pointer to the next instance of a given routine in the tree. For example, in FIG. 11B, node 1154 would contain a parent pointer to node 1156, a first child pointer to node 1158, a next sibling pointer equal to NULL (note that node 1154 does not have a next sibling), and a next instance pointer to node 1162. Those skilled in the art will appreciate that other pointers may be stored to make subsequent analysis more efficient. In addition, other structural elements, such as tables for the properties of a routine that are invariant across instances (e.g., the routine's name), may also be stored.

The type of performance information and statistics maintained at each node are not constrained to time-based performance statistics. The present invention may be used to present many types of trace information in a compact manner which supports performance queries. For example, rather than keeping statistics regarding time, tracing may be used to track the number of Java bytecodes executed in each method (i.e., routine) called. The tree structure of the present invention would then contain statistics regarding bytecodes executed rather than time. In particular, the quantities recorded in the second and third categories would reflect the number of bytecodes executed rather than the amount of time spent in each method.

Tracing may also be used to track memory allocation and deallocation. Every time a routine creates an object, a trace record could be generated. The tree structure of the present invention would then be used to efficiently store and retrieve information regarding memory allocation. Each node would represent the number of method calls, the amount of memory allocated within a method, the amount of memory allocated by methods called by the method, and the number of methods above this instance (i.e., the measure of recursion). Those skilled in the art will appreciate that the tree structure of the present invention may be used to represent a variety of performance data in a manner which is very compact, and allows a wide variety of performance queries to be performed.

The tree structure shown in FIG. 11B depicts one way in which data may be pictorially presented to a user. The same data may also be presented to a user in tabular form as shown in FIG. 12.

With reference now to FIG. 12, a call stack tree presented as a table will now be described. Note that FIG. 12 contains a routine, pt_pidtid, which is the main process/thread which calls routine C. Table 12 includes columns of data for Level 1230, RL 1232, Calls 1234, Base 1236, Cum 1238, and Indent 1240. Level 1230 is the tree level (counting from the root as level 0) of the node. RL 1232 is the recursion level. Calls 1234 is the number of occurrences of this particular call stack, i.e., the number of times this distinct call stack configuration occurs. Base 1236 is the total observed time in the particular call stack, i.e., the total time that the stack had exactly these routines on the stack. Cum 1238 is the total time in the particular call stack plus deeper levels below it. Indent 1240 depicts the level of the tree in an indented manner. From this type of call stack configuration information, it is possible to infer each unique call stack configuration, how many times the call stack configuration occurred, and how long it persisted on the stack. This type of information also provides the dynamic structure of a program, as it is possible to see which routine called which other routine. However, there is no notion of time-order in the call stack tree. It cannot be inferred that routines at a certain level were called before or after other routines on the same level.

Figure 13:
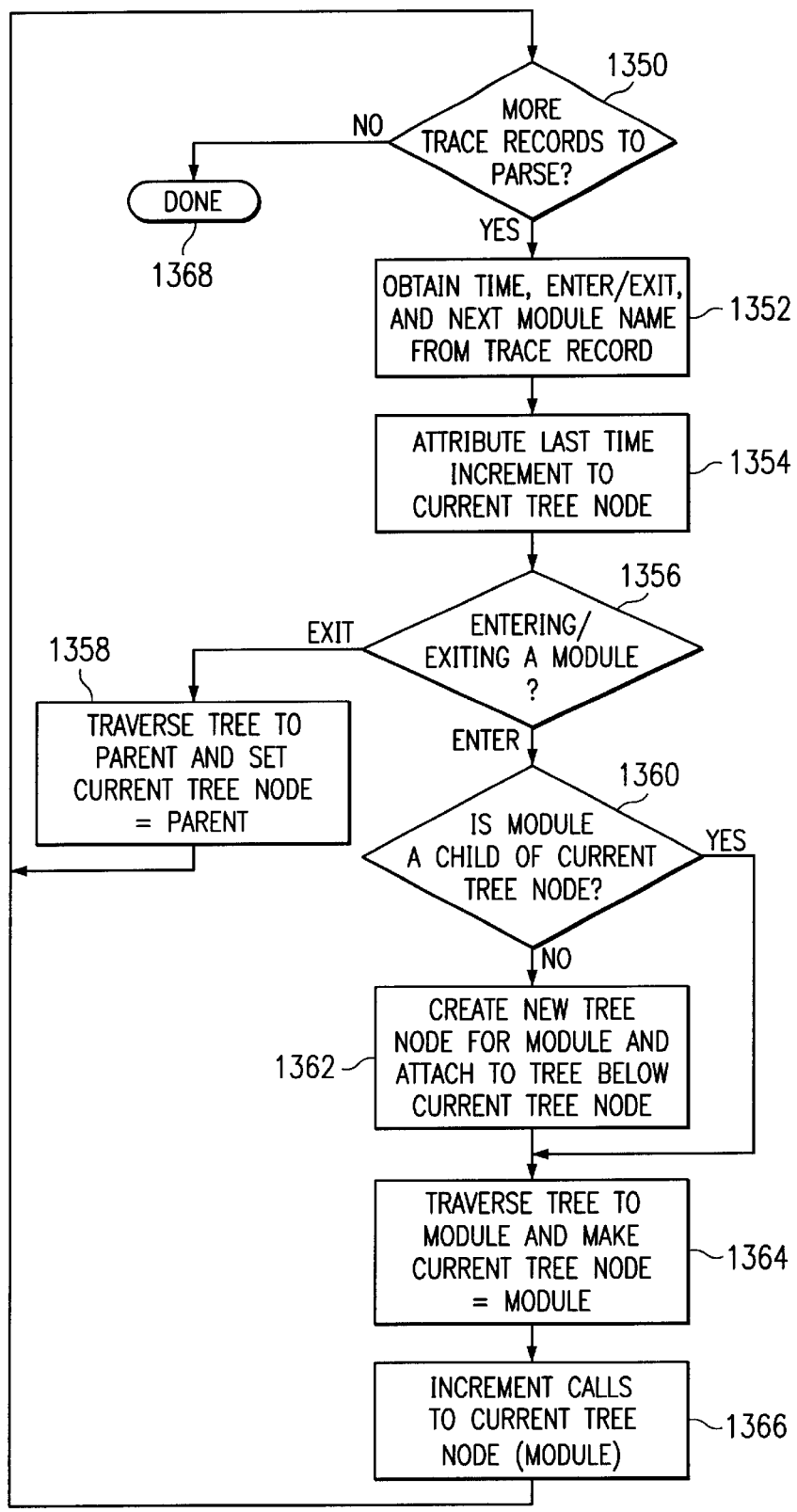
FIG. 13 is a flow chart depicting a method for building a call stack tree using a trace text file as input.

The pictorial view of the call stack tree, as illustrated in FIG. 11B, may be built dynamically or built statically using a trace text file or binary file as input. FIG. 13 depicts a flow chart of a method for building a call stack tree using a trace text file as input. In FIG. 13, the call stack tree is built to illustrate module entry and exit points.

With reference now to FIG. 13, it is first determined if there are more trace records in the trace text file (step 1350). If so, several pieces of data are obtained from the trace record, including the time, whether the event is an enter or an exit, and the module name (step 1352). Next, the last time increment is attributed to the current node in the tree (step 1354). A check is made to determine if the trace record is an enter or an exit record (step 1356). If it is an exit record, the tree is traversed to the parent (using the parent pointer), and the current tree node is set equal to the parent node (step 1358). If the trace record is an enter record, a check is made to determine if the module is already a child node of the current tree node (step 1360). If not, a new node is created for the module and it is attached to the tree below the current tree node (step 1362). The tree is then traversed to the module's node, and the current tree node is set equal to the module node (step 1364). The number of calls to the current tree node is then incremented (step 1366). This process is repeated for each trace record in the trace output file, until there are no more trace records to parse (step 1368).

Figure 14:
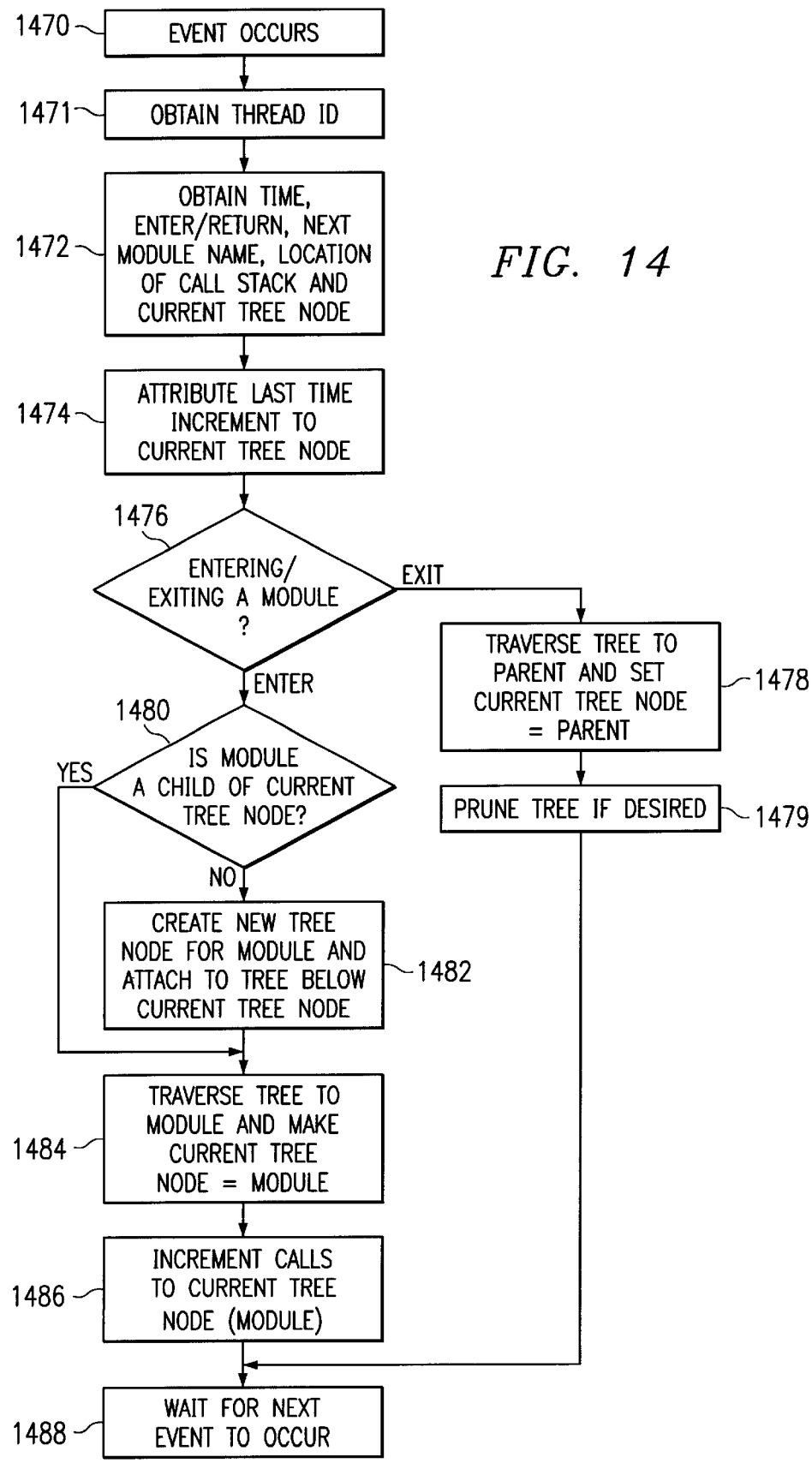
FIG. 14 is a flow chart depicting a method for building a call stack tree dynamically as tracing is taking place during system execution.

With reference now to FIG. 14, a flow chart depicts a method for building a call stack tree dynamically as tracing is taking place during system execution. In FIG. 14, as an event is logged, it is added to the tree in real time. Preferably, a call stack tree is maintained for each thread. The call stack tree reflects the call stacks recorded to date, and a current tree node field indicates the current location in a particular tree. When an event occurs (step 1470), the thread ID is obtained (step 1471). The time, type of event (i.e., in this case, whether the event is a method entry or exit), the name of the module (i.e., method), location of the thread's call stack, and location of the thread's "current tree node" are then obtained (step 1472). The last time increment is attributed to the current tree node (step 1474). A check is made to determine if the trace event is an enter or an exit event (step 1476). If it is an exit event, the tree is traversed to the parent (using the parent pointer), and the current tree node is set equal to the parent node (step 1478). At this point, the tree can be dynamically pruned in order to reduce the amount of memory dedicated to its maintenance (step 1479). Pruning is discussed in more detail below. If the trace event is an enter event, a check is made to determine if the module is already a child node of the current tree node (step 1480). If not, a new node is created for the module, and it is attached to the tree below the current tree node (step 1482). The tree is then traversed to the module's node, and the current tree node is set equal to the module node (step 1484). The number of calls to the current tree node is then incremented (step 1486). Control is then passed back to the executing module, and the dynamic tracing/reduction program waits for the next event to occur (step 1488).

One of the advantages of using the dynamic tracing/reduction technique described in FIG. 14 is its enablement of long-term system trace collection with a finite memory buffer. Very detailed performance profiles may be obtained without the expense of an "infinite" trace buffer. Coupled with dynamic pruning, the method depicted in FIG. 14 can support a fixed-buffer-size trace mechanism.

The use of dynamic tracing and reduction (and dynamic pruning in some cases) is especially useful in profiling the performance characteristics of long running programs. In the case of long running programs, a finite trace buffer can severely impact the amount of useful trace information that may be collected and analyzed. By using dynamic tracing and reduction (and perhaps dynamic pruning), an accurate and informative performance profile may be obtained for a long running program.

Many long-running applications reach a type of steady-state, where every possible routine and call stack is present in the tree and updating statistics. Thus, trace data can be recorded and stored for such applications indefinitely within the constraints of a bounded memory requirement using dynamic pruning. Pruning has value in reducing the memory requirement for those situations in which the call stacks are actually unbounded. For example, unbounded call stacks are produced by applications that load and run other applications.

Pruning can be performed in many ways, and a variety of pruning criteria is possible. For example, pruning decisions may be based on the amount of cumulative time attributed to a subtree. Note that pruning may be disabled unless the amount of memory dedicated to maintaining the call stack exceeds some limit. As an exit event is encountered (such as step 1478 in FIG. 14), the cumulative time associated with the current node is compared with the cumulative time associated with the parent node. If the ratio of these two cumulative times does not exceed a pruning threshold (e.g., 0.1), then the current node and all of its descendants are removed from the tree. The algorithm to build the tree proceeds as before by traversing to the parent, and changing the current node to the parent.

Many variations of the above pruning mechanism are possible. For example, the pruning threshold can be raised or lowered to regulate the level of pruning from very aggressive to none. More global techniques are also possible, including a periodic sweep of the entire call stack tree, removing all subtrees whose individual cumulative times are not a significant fraction of their parent node's cumulative times.

Data reduction allows analysis programs to easily and quickly answer many questions regarding how computing time was spent within the traced program. This information may be gathered by "walking the tree" and accumulating the data stored at various nodes within the call stack tree, from which it can be determined the amount of time spent strictly within routine A, the total amount of time spent in routine A and in the routines called by routine A either directly or indirectly, etc.

With reference now to the FIG. 15, a diagram of a structured profile obtained using the processes of the present invention is illustrated. Profile 1500 shows sample numbers in column 1502. Column 1504 shows the call stack with an identification of the functions present within the call stack at different sample times.

With reference now to FIG. 16, a diagram of a record generated using the processes of present invention is depicted. Each routine in record 1600 is listed separately, along with information regarding the routine in FIG. 16. For example, calls column 1604 lists the number of times each routine has been called. BASE column 1606 contains the total time spent in the routine, while CUM column 1608 includes the cumulative time spent in the routine and all routines called by the routine. Name column 1612 contains the name of the routine.

With reference now to FIG. 17, a diagram of another type of report that may be produced is depicted. The report depicted in FIG. 17 illustrates much of the same information found in FIG. 16, but in a slightly different format. As with FIG. 16, diagram 1700 includes information on calls, base time, and cumulative time.

FIG. 17 shows a sample-based trace output containing times spent within various routines as measured in microseconds. FIG. 17 contains one stanza (delimited by horizontal lines) for each routine that appears in the sample-based trace output. The stanza contains information about the routine itself on the line labeled "Self", about who called it on lines labeled "Parent", and about who the routine called on lines labeled "Child". The stanzas are in order of cum time. The third stanza is about routine A, as indicated by the line beginning with "Self." The numbers on the "Self" line of this stanza show that routine A was called three times in this trace, once by routine C and twice by routine B. In the profile terminology, routines C and B are (immediate) parents of routine A. Routine A is a child of routines C and B. All the numbers on the "Parent" rows of the second stanza are breakdowns of routine A's corresponding numbers. Three microseconds of the seven microsecond total base time spent in A was when it was called by routine C, and three microseconds when it was first called by routine B, and another one microsecond when it was called by routine B for a second time. Likewise, in this example, half of routine A's fourteen microsecond cum time was spent on behalf of each parent.

Looking now at the second stanza, we see that routine C called routine B and routine A once each. All the numbers on "Child" rows are subsets of numbers from the child's profile. For example, of the three calls to routine A in this trace, one was by routine C; of routine A's seven microsecond total base time, three microseconds were while it was called directly by routine C; of routine A's fourteen microsecond cum time, seven microseconds was on behalf of routine C. Notice that these same numbers are the first row of the third stanza, where routine C is listed as one of routine A's parents.

The four relationships that are true of each stanza are summarized at the top of FIG. 17. First, the sum of the numbers in the Calls column for parents equals the number of calls on the self row. Second, the sum of the numbers in the Base column for parents equals Self's base. Third, the sum of the numbers in the Cum column for parents equals Self's Cum. These first three invariants are true because these characteristics are the definition of Parent; collectively they are supposed to account for all of Self's activities. Fourth, the Cum in the Child rows accounts for all of Self's Cum except for its own Base.

Program sampling contains information from the call stack and provides a profile, reflecting the sampling of an entire call stack, not just the leaves. Furthermore, the sample-based profiling technique may also be applied to other types of stacks. For example, with Java programs, a large amount of time is spent in a routine called the "interpreter". If only the call stack was examined, the profile would not reveal much useful information. Since the interpreter also tracks information in its own stack, e.g., a Java stack (with its own linkage conventions), the process can be used to walk up the Java stack to obtain the calling sequence from the perspective of the interpreted Java program.

With reference now to FIG. 18, a figure depicts a report generated from a trace file containing both event-based profiling information (method entry/exits) and sample-based profiling information (stack unwinds). FIG. 18 is similar to FIG. 12, in which a call stack tree is presented as a report, except that FIG. 18 contains embedded stack walking information. Call stack tree 1800 contains two stack unwinds generated within the time period represented by the total of 342 ticks. Stack unwind identifier 1802 denotes the beginning of stack unwind information 1806, with the names of routines that are indented to the right containing the stack information that the stack walking process was able to discern. Stack unwind identifier 1804 denotes the beginning of stack unwind information 1808. In this example, "J:" identifies an interpreted Java method and "F:" identifies a native function, such as a native function within JavaOS. A call from a Java method to a native method is via "ExecuteJava." Hence, at the point at which the stack walking process reaches a stack frame for an "ExecuteJava," it cannot proceed any further up the stack as the stack frames are discontinued. The process for creating a tree containing both event-based nodes and sample-based nodes is described in more detail further below. In this case, identifiers 1802 and 1804 also denote the major code associated with the stack unwind.

With reference now to FIG. 19, a table depicts major codes and minor codes that may be employed to instrument software modules for profiling. In order to facilitate the merging of event-based profiling information and sample-based profiling information, a set of codes may be used to turn on and off various types of profiling functions.

For example, as shown in FIG. 19, the minor code for a stack unwind is designated as 0x7fffffff, which may be used for two different purposes. The first purpose, denoted with a major code of 0x40, is for a stack unwind during a timer interrupt. When this information is output into a trace file, the stack information that appears within the file will have been coded so that the stack information is analyzed as sample-based profiling information. The second purpose, denoted with a major code of 0x41, is for a stack unwind in an instrumented routine. This stack information could then be post-processed as event-based profiling information.

Other examples in the table show a profile or major code purpose of tracing jitted methods with a major code value of 0x50. Tracing of jitted methods may be distinguished based on the minor code that indicates method invocation or method exit. In contrast, a major code of 0x30 indicates a profiling purpose of instrumenting interpreted methods, while the minor code again indicates, with the same values, method invocation or method exit.

Referring back to FIG. 18, the connection can be made between the use of major and minor codes, the instrumentation of code, and the post-processing of profile information. In the generated report shown in FIG. 18, the stack unwind identifiers can be seen to be equal to 0x40, which, according to the table in FIG. 19, is a stack unwind generated in response to a timer interrupt. This type of stack unwind may have occurred in response to a regular interrupt that was created in order to generate a sampled profile of the executing software.

As noted in the last column of the table in FIG. 19, by using a utility that places a hook into a software module to be profiled, a stack unwind may be instrumented into a routine. If so, the output for this type of stack unwind will be designated with a major code of 0x41.

In order to support tracing within multiple instances of JVMs executing simultaneously on a single computer platform, one requires the ability to separate the output from each of the multiple JVMs, especially in a software configuration in which a single profiler dynamic link library (DLL) is used to generate the trace records from the different applications being profiled. Otherwise, additional work would be required to determine the origin of the trace data so that the trace data may be attributed to the proper application program being profiled.

Each instance of a JVM executes as a separate process within the profiling environment. By recognizing this fact, the process identifier, or PID, of each JVM may be used as a unique identifier to be associated with the trace data from the different application programs. When a thread is dispatched by a JVM, the thread is associated with the process of the JVM—all threads dispatched by a particular JVM are associated with the PID of the dispatching JVM. Hence, any trace events or other trace data generated by a thread may be maintained, separated, or stored based on the PID of its JVM. By using a JVM's PID in the name of each trace output file and then eventually storing the trace records from a particular JVM into its own trace output file, the names of the trace output files may be made unique while simultaneously associating a trace output file with a corresponding application being profiled and executing within a JVM.

When a user is profiling an application, the desired final result is some type of profile report showing the execution flows within the application. In order to attribute trace events to the appropriate routines, the post-processing phase requires knowledge of the thread in which a trace record was originated. Hence, in addition to maintaining, separating, and storing trace records based on the PID of the associated JVM, trace records must be tracked in some manner so that they can be associated with a particular thread. For example, as noted previously with respect to FIG. 8, when generating a trace record for a call stack unwind, a PID of the interrupted thread and a TID, i.e., the thread identifier for the interrupted thread, are output into a trace record. Other types of trace records may also record so-called pid_tid pairs.

The association of trace records with threads is explained in more detail further below. Briefly, trace records are generally associated with a particular thread by generating a trace record when a thread is dispatched and when a thread switch is detected to have occurred. The information about the originating process and thread for a trace record is then used to attribute execution flow information to the appropriate routines. The present invention is directed to the ability to support tracing within multiple instances of JVMs executing simultaneously on a single computer platform by maintaining the ability of a post-processor to sort or filter trace records by their originating process identifier information and originating thread identifier information.

As noted above, a single profiler DLL is used to generate the trace records from the different applications being profiled. There are several ways in which a profiler DLL may be associated with a JVM. When a user invokes a Java program through a command line interface, the user may also specify through command line arguments or parameters that the program is to be profiled using the available trace tools. For each invocation of a JVM with tracing enabled, the profiler may be notified of the PID for the newly loaded JVM, at which point the profiler may create a trace output file associated with the JVM.

Alternatively, if a "dispatching" application is used to batch or invoke the application to be profiled, then an environment variable associated with the dispatching application may be read to determine the parameters to be associated with the dispatched application, such as a parameter to indicate that the application should be profiled while executing.

Environment variables generally reside in configuration files on a client machine. In the most common case, a user may set an environment variable within the configuration file in order to pass configuration values to an application program. For example, in the DOS operating system, a user may set environment variables within the "autoexec.bat" file, or the .profile or .dtprofile on AIX, and environment variables within the file are then available in the runtime environment for various applications. The operating system may read the values in the configuration file in order to initialize the environment variables upon startup, or an application program may access the configuration file to dynamically read a value for an environment variable.

In the Java runtime environments, values may be stored in property files that are associated with Java applications. In another example, the Microsoft Windows operating system provides registry files that may be used to set environment variables for various applications. In some Unix implementations, an environment variable may be stored in a user's .login file or .profile file.

Figure 20:
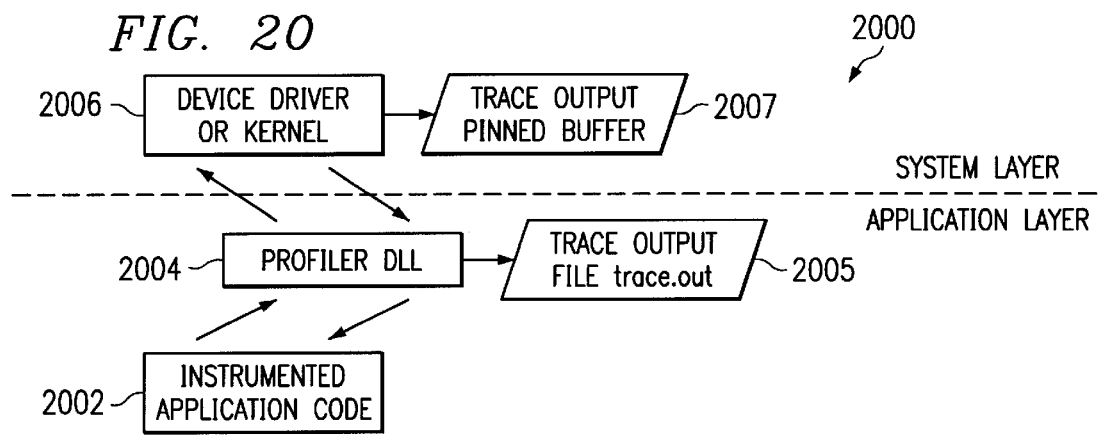
FIG. 20 is a block diagram depicting an organization of system components for tracing an application program executing within a JVM using a profiler.

With reference now to FIG. 20, a block diagram depicts an organization of system components for tracing an application program executing within a JVM using a profiler. System 2000 contains instrumented application code 2002 that, upon the occurrence of selected events, invoke methods or routines within profiling code, such as profiler dynamic link library (DLL) 2004. Profiler 2004 may contain the functionality necessary for generating trace records that are output to a trace buffer or trace file, such as trace file 2005. For example, to detect the occurrence of a method entry, when the method is entered, a routine within the profiler DLL is executed, and this routine generates a trace record that records the occurrence of the method entry event.

Profiler 2004 may request and receive certain types of system information from device driver or kernel 2006. The kernel may independently generate process-relative records for events known only at the system layer, such as thread switches, and kernel 2006 may write the trace records to a trace file or a pinned buffer, such as pinned buffer 2007. When the kernel is generating trace information, the trace records are preferably written to a pinned buffer such that the system does not swap out the memory containing the trace records. A process may be executing in the background at low priority to transfer the trace records from the pinned buffer to a permanent file.

The kernel may also keep thread-relative information, such as thread-relative metrics, in a variety of data structures, such as trees, linked lists, hash tables, etc. As a thread is dispatched, a data structure entry may be created for a newly dispatched thread, and when the thread terminates, the entry may be either deleted or kept in memory for diagnostic or profiling purposes. This information may include a thread-relative elapsed time to be subsequently used as an amount of base time to be attributed, as a statistic in a call stack tree data structure, to a routine or module executing within instrumented application code 2002.

Figure 21A:
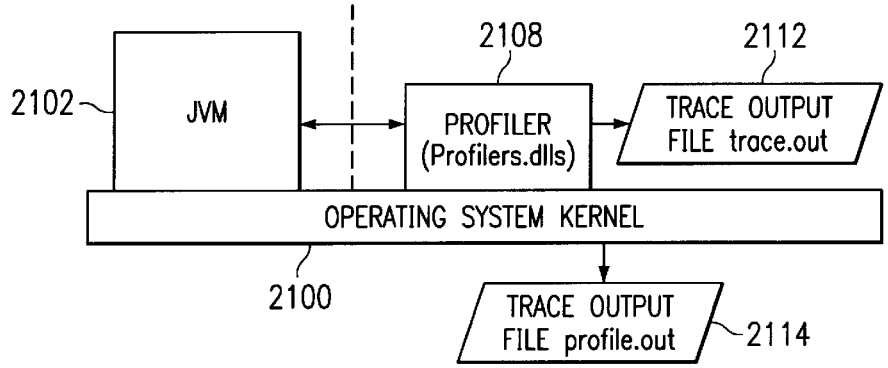
FIG. 21A is a block diagram depicting the relationships between a profiler and a single JVM in a data processing system capable of generating trace data to profile an executing program.

With reference now to FIG. 21A, a block diagram depicts the relationships between a profiler and a single JVM in a data processing system capable of generating trace data to profile an executing program. Operating system kernel 2100 provides native support for the execution of programs and applications, such as JVM 2102, in a data processing system, and JVM 2102 executes Java programs. Profiler 2108 accepts events from JVM 2102 from instrumented hooks, interrupt events, etc., through JVM Profiling Interface (JVMPI) 2110, and returns information as required. Preferably, profiler 2108 is a set of native runtime DLLs (dynamic link libraries) supported by kernel 2100. Profiler 2108 generates call stack trees, trace output file "trace.out" 2112, etc. as necessary to provide a runtime profile to an application developer monitoring the execution of a profiled program. Concurrently, kernel 2100 may generate trace records which are eventually written (via a pinned buffer) to a trace output file, such as profile.out 2114. The type of trace records generated by profiler 2108 are related to event or sample data generated at the application layer. The type of trace records generated by kernel 2100 are related to events or sample data generated at the system layer. All of the trace output files may then be processed together or separately during the post-processing phase.

In the example shown in FIG. 21A, the profiler may output all of the generated trace records into a single file because the environment only supports a single JVM, and the trace output file does not have any particular name associated with it.

Since most computer systems are interruptable, multi-tasking systems, the operating system kernel may perform certain actions underneath the profiling processes, unbeknownst to the profiling processes. In this context, the most important of these actions is a thread switch. While an application that is being profiled is executing, the operating system may perform a thread switch between threads of the application program or may switch to a thread associated with another application program.

In order to properly associate a trace record with its originating thread, other trace records associated with thread-related events are generated by the originating JVM, by the profiler DLL, and by the kernel. When a JVM requests a new thread from the kernel, the JVM generates a trace record, via the profiler DLL, for the new thread. When the kernel dispatches a thread, the kernel generates a trace record for the thread dispatch.

When the JVM creates a new thread, the JVM assigns a unique thread identifier. When the kernel actually creates the thread, the kernel assigns a unique, system-level thread identifier, and the TIDs may not be identical. Hence, the two TIDs must be correlated.

Although the trace records from the kernel are eventually placed, via a pinned buffer, into a trace output file that is different from the trace output file into which the profiler DLL writes its trace records, since the trace record generated by the JVM contains a timestamp and the trace record generated by the kernel contains a timestamp, then the two timestamps can be correlated by the trace post-processor to determine the thread-relative operations performed for particular threads. In other words, the different TIDs can be matched so that subsequent trace records within different trace files can be associated with a single particular thread.

In order to fully associate subsequent trace records with particular threads, in addition to the JVM and the kernel generating trace records when a thread is dispatched, the kernel will generate a trace record when a thread switch occurs, and the profiler DLL will generate a trace record each time that it detects that a thread switch must have occurred. The profiler keeps a TID variable that tracks the JVM's TID associated with the most currently generated trace record. Each time that the profiler DLL is invoked to generate a trace record, i.e. each time that the profiler DLL "receives" an event from a method in a particular thread, the profiler DLL checks whether the TID of the currently executing thread is the same as the TID of the previously executing thread as recorded in the TID variable. If the TIDs differ, then the profiler DLL has detected that a thread switch has occurred, and the profiler generates a trace record indicating that a thread switch has occurred and giving the TID of the newly executing thread.

Hence, through the correlation of trace records for kernel-level, thread-related events and application-level, thread-related events, a trace post-processor may then distinguish which trace records should be associated with particular threads.

Figure 21B:
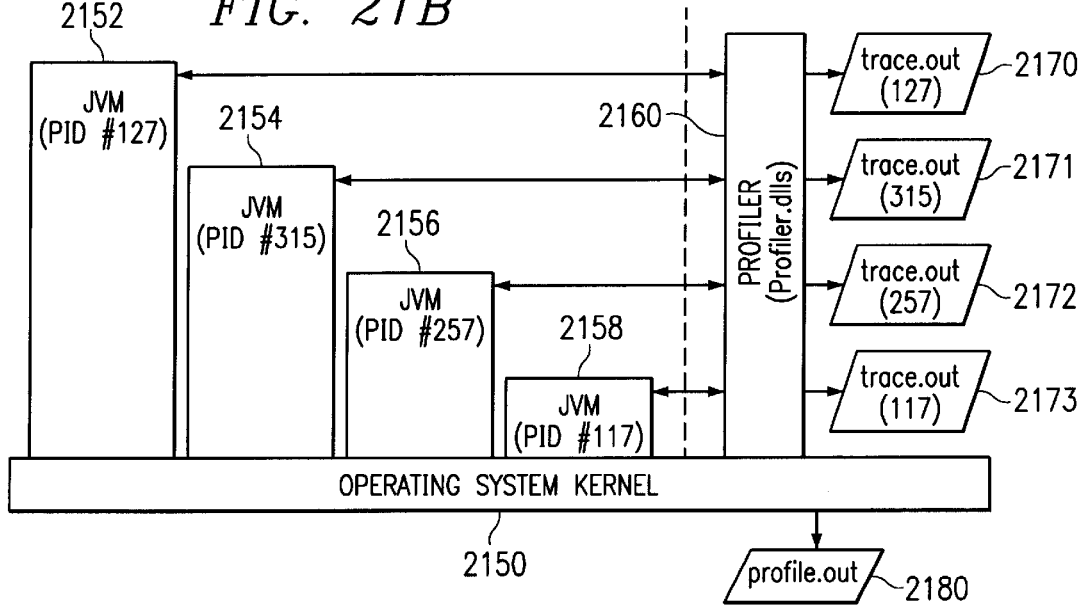
FIG. 21B is a block diagram depicting the relationships between a profiler and multiple JVMs in a data processing system capable of generating trace data to profile an executing program.

With reference now to FIG. 21B, a block diagram depicts the relationships between a profiler and multiple JVMs in a data processing system capable of generating trace data to profile an executing program. Operating system kernel 2150 provides native support for the execution of programs and applications, such as JVMs 2152–2158, which execute Java programs. Profiler 2160 accepts events from JVMs 2152–2158 from instrumented hooks, interrupt events, etc., through JVM Profiling Interface (JVMPI) 2162, and returns information as required. Preferably, profiler 2160 is a set of native runtime DLLs (dynamic link libraries) supported by kernel 2150. Profiler 2160 generates call stack trees, trace output files 2170–2173, etc., as necessary to provide a runtime profile to an application developer monitoring the execution of a profiled program.

In the example shown in FIG. 21B: JVM 2152 has an associated PID #127; JVM 2154 has an associated PID #315; JVM 2156 has an associated PID #257; and JVM 2158 has an associated PID #117. In a corresponding manner, profiler 2160 generates trace records for the events within each JVM and outputs the trace records into corresponding output files in which the output files have names that incorporate the PIDs of their corresponding JVMs. In the example, the file names have the PID appended at the end of the file name. JVM 2152 has an associated trace output file named "trace.out(127)"; JVM 2154 has an associated trace output file named "trace.out(315)"; JVM 2156 has an associated trace output file named "trace.out(257)"; and JVM 2158 has an associated trace output file named "trace.out(117)."

Concurrently, kernel 2150 may generate trace records which are eventually written (via a pinned buffer) to a trace output file, such as profile.out 2180. The type of trace records generated by profiler 2160 are related to event or sample data generated at the application layer. The type of trace records generated by kernel 2150 are related to events or sample data generated at the system layer. All of the trace output files may then be processed together or separately during the post-processing phase.

Figure 22:
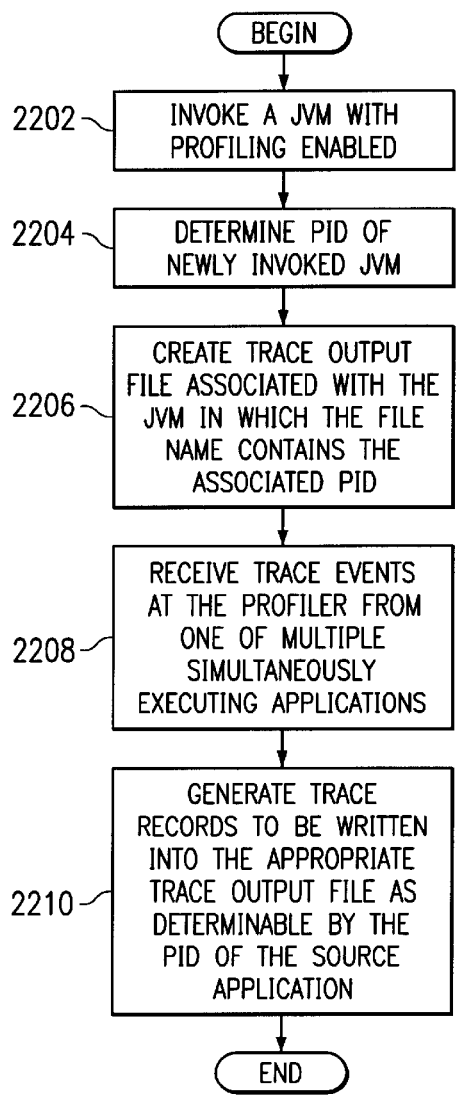
FIG. 22 is a flowchart depicting a process for creating unique file names for storing trace output data generated for multiple applications being profiled simultaneously.

With reference now to FIG. 22, a flowchart depicts a process for creating unique file names for storing trace output data generated for multiple applications being profiled simultaneously. The process begins with the invocation of a JVM with tracing enabled (step 2202). The profiler determines the PID associated with the JVM (step 2204) and creates a trace output file to be associated with the JVM with a file name containing the correlated PID of the JVM (step 2206). As one of possibly multiple simultaneously executing application programs executes, trace events are sent to the profiler (step 2208), which generates trace records to be written into the appropriate trace output file as determinable by the PID of the source application (step 2210). The process is then complete with respect to directing the trace output associated with an application into the appropriate trace output file.

Referring again to FIG. 20, it can be seen that trace records may be generated at the application layer by code within a profiler DLL while trace records may also be generated at the system layer by code within a device driver or kernel. Each of these sources of trace records may concern itself with different types of trace information.

For example, routines within the application program being profiled may have been instrumented with entry and exit trace hooks. As these trace hooks "fire" or are executed, a trace record may be generated that contains information for its associated event, i.e. the entry into or exit from the routine.

If necessary, the system may be implemented such that certain events that are detected at the application layer prompt the profiling code to pass information to the system layer. Once the kernel or device driver receives the data, then a trace record is generated by the kernel or device driver. This type of implementation may be necessary to include system-level information within the trace record. This system-level information is unknown to the code at the application layer and would not otherwise be able to be output in the trace records by the profiling code. The event must, therefore, be passed to the system layer, or the system layer otherwise notified, in order to obtain the desired trace-related data at the time that the trace record is generated.

In contrast, there may be events, such as process switches or thread switches or dispatches for threads within a process, that occur within a kernel or device driver that are unknown at the application layer. In order to obtain a complete profile of the executing application program, these events should prompt the generation of trace records.

One advantage of the present invention is that a trace record generated at the application layer for a particular process is separated from other trace records for other processes based on an inclusion property of the trace record in a particular trace output file. In other words, a trace record for a particular process is written into a trace output file, and the trace output file name, which comprises a PID, identifies the owning process of the contained trace records.

When combined with the fact that the kernel or device driver at the system layer can generate trace records for system-related events that include a PID as part of the data in the trace record, trace records for process-related events from both the application layer and system layer may be merged relatively easily with the present invention. A significant advantage of this methodology is that the application layer does not need to send certain events or notify the system layer of certain events in order to get system-level information into the trace record associated with the event. For example, if the system layer has information related to a process that is unknown to the application layer, such as process-related information, then without the present invention, the application layer must somehow send data to the system layer for inclusion in a trace record generated by the system layer for the process.

With the present invention, however, the application layer can place trace records from separate processes into separate trace output files, and the system layer can place trace records containing process-related information, including PIDs, from separate processes into a single trace output file. During a post-processing phase, the trace output file from the system layer may then be filtered by PID to obtain trace records containing a particular PID, and those trace records may then be merged with the trace records from the process-specific trace output file to obtain a process-specific execution profile.

Figure 23:
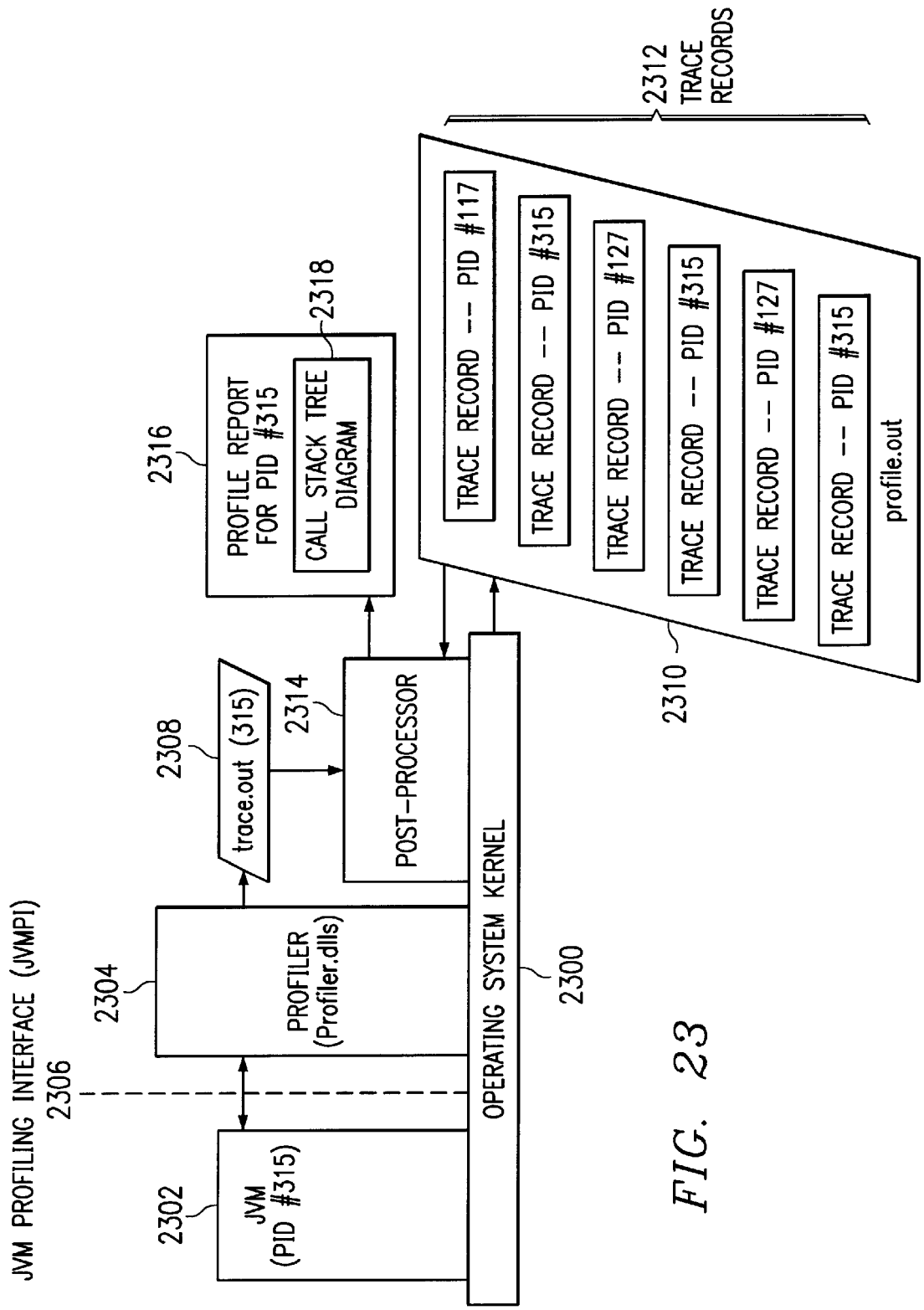
FIG. 23 is a diagram depicting the manner in which trace records for a particular process generated at the application layer and the system layer may be merged.

With reference now to FIG. 23, a diagram shows the manner in which trace records for a particular process generated at the application layer and the system layer may be merged. In a manner similar to FIG. 21A and FIG. 21B, operating system kernel 2300 provides native support for the execution of programs and applications, such as JVM 2302, in a data processing system, and JVM 2302 executes Java programs. Profiler 2304 accepts events from JVM 2302 from instrumented hooks, interrupt events, etc., through JVMPI 2306, and returns information as required. Preferably, profiler 2304 is a set of native runtime DLLs supported by kernel 2300. Profiler 2304 generates process-specific trace output file "trace.out(315)" 2308 for JVM 2303 running as PID "315" under kernel 2300. Concurrently, kernel 2300 may generate trace records which are eventually written to general trace output file 2310, such as "profile.out". Trace output file 2310 contains trace records 2312 from various processes, and the originating source for each of the trace records may be identified by the PID stored in the trace record.

Post-processor 2314 reads both general trace output file 2312 and process-specific trace output file 2308 to generate profile report 2316, which may contain such data objects as call stack tree diagram 2318. Although post-processor 2314 is shown as a non-Java program executing outside of a JVM, post-processor 2314 may alternatively be a Java program executing within a JVM. Post-processor 2314 filters the process-specific trace records in general trace output 2312 using the PID of the profiled application program for which post-processor 2314 is generating profile report 2316. In this manner, trace records may be easily merged from more than one source.

Figure 24:
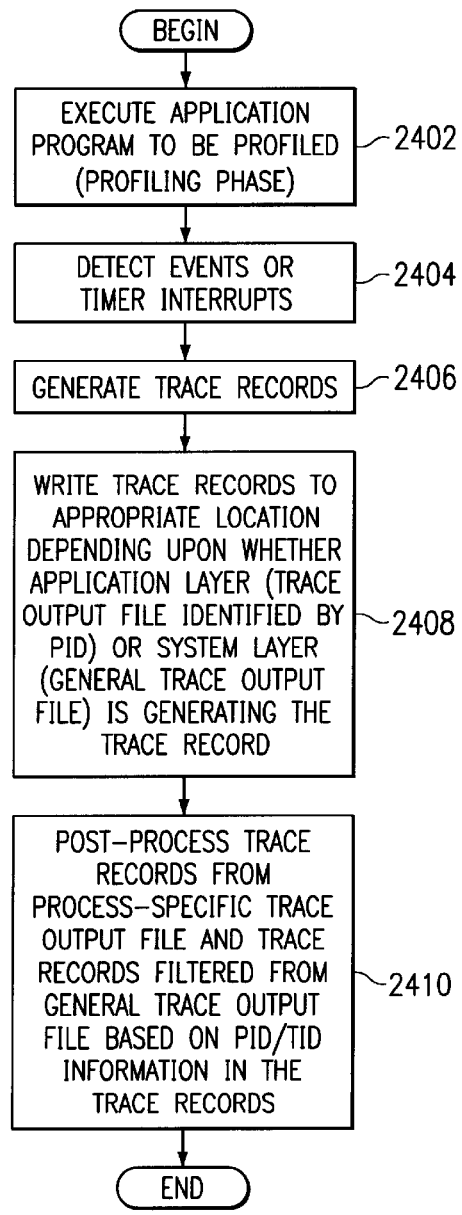
FIG. 24 is a flowchart depicting a process for using trace records from different sorces in which the trace records may be merged based on a process identifier.

With reference now to FIG. 24, a flowchart depicts a process for using trace records from different sources in which the trace records may be merged based on a process identifier. The process begins when an application program is executed during a profiling phase (step 2402). Events or timer ticks are then detected and processed (step 2404), and trace records are generated (step 2406).

Trace records are then written to the appropriate location (step 2408), either a trace output file identified by PID (as explained with respect to FIG. 21 and FIG. 22 above) or a general trace output file, depending upon whether the application layer or system layer is generated the trace record, respectively. It should be noted that the manner in which the trace records are written to the output files may vary significantly depending upon the desired implementation. Instrumented code at the application level may write trace records to a mapped file in memory, thereby avoiding significant I/O overhead. The system layer may write trace records to a pinned buffer, and a concurrently running process may eventually write the data in the pinned buffer to a permanent file.

By placing the trace records in a pinned buffer, the system does not swap out the memory containing the trace records; otherwise, the timestamps that are recorded within the event record would capture the execution time required for the data to be rolled back into memory in addition to the execution time for processing the event. However, depending upon the desire of the user for profiling the executing program or system, e.g., if the user was interested in analyzing the performance characteristics of the entire profiling system including memory performance, the user may desire to capture execution flows that include the captured timestamps that contain time periods with memory swapping. Another example in which a pinned buffer may be useful is for events that are placed in sensitive areas, e.g. system dispatch logic—a pinned buffer might be used because it may be unsafe for a page fault to occur during the execution of such code.

Alternatively, the trace records may be written by a specialized piece of hardware which accepts data and provides its own timestamps. This hardware, or trace card, could be implemented as a PCI card. With this approach, the system can send the type of trace record and the trace record data to the card, and the card generates the trace record including the timestamps and relevant control information.

The trace records for a particular process are then processed during a post-processing phase by reading the trace records from a process-specific trace output file and trace records that have been filtered from the general trace output file using the pid_tid information for the particular process and the pid_tid information in the trace records of the general trace output file(step 2410). The process is then complete with respect to merging the trace records from a particular process.

The advantages of the present invention are apparent in view of the detailed description of the invention provided above. Multiple instances of JVMs may be executing simultaneously, and each JVM may be generating trace records through the profiler DLL. However, the origin of the trace records, as identified by the process identifier, or PID, of the JVM is used to place the trace information into a file that is identified through the use of the same PID.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of monitoring execution performance of a program, the method comprising the steps of:

determining a first process identifier associated with a first process within the program;

creating a first trace output file, wherein a file name of the first trace output file comprises the first process identifier;

writing first trace records associated with the first process to the first trace output file, creating a second trace output file, wherein the second trace output file is associated with an operating system kernel;

generating second trace records in response to events within the operating system kernel; and writing the second trace records associated with the operating system kernel to the second trace output file.

2. The method of claim 1 wherein the first trace records are generated in response to events within the first process.

3. The method of claim 1 further comprising:

creating a third trace output file, wherein the third trace output file is associated with a second process, and wherein a file name of the third trace output file comprises the second process identifier;

generating third trace records in response to events within the second process; and writing the third trace records associated with the second process to the third trace output file.

4. The method of claim 3 wherein the first process and the second process execute concurrently.

5. The method of claim 1 wherein the second process is a Java virtual machine.

6. The method of claim 1 wherein the first trace records comprise the first process identifier.

7. The method of claim 1 wherein the first process is a Java virtual machine.

8. The method of claim 1, further comprising:
merging execution statistics derived from the first trace records associated with the first process with execution statistics derived from the second trace records associated with the operating system kernel.

9. A data processing system of monitoring execution performance of a program, the data processing system comprising:
determining means for determining a first process identifier associated with a first process within the program;
first creating means for creating a first trace output file, wherein a file name of the first trace output file comprises the first process identifier;
writing means for writing first trace records associated with the first process to the first trace output file;
second creating means for creating a second trace output file, wherein the second trace output file is associated with an operating system kernel;
generating means for generating second trace records in response to events within the operating system kernel; and
second writing means for writing the second trace records associated with the operating system kernel to the second trace output file.

10. The data processing system of claim 9, wherein the first trace records are generated in response to events within the first process.

11. The data processing system of claim 9, further comprising:
third creating means for creating a third trace output file, wherein the third trace output file is associated with a second process, and wherein a file name of the third trace output file comprises the second process identifier;
second generating means for generating third trace records in response to events within the second process; and
third writing means for writing the bird trace records associated with the second process to the third trace output file.

12. The data processing system of claim 11 wherein the first process and the second process execute concurrently.

13. The data processing system of claim 9 wherein the second process is a Java virtual machine.

14. The data processing system of claim 9, wherein the first trace records comprise the first process identifier.

15. The data processing system of claim 9 wherein the first process is a Java virtual machine.

16. The data processing system of claim 9 further comprising:
merging means for merging execution statistics derived from the first trace records associated with the first process with execution statistics derived from the second trace records associated with the operating system kernel.

17. A computer program product in a computer-readable medium for use in a data processing system for monitoring execution performance of an application, the computer program product comprising:
first instructions for determining a first process identifier associated with a first process within the application;
second instructions for creating a first trace output file, wherein a file name of the first trace output file comprises the first process identifier;
third instructions for writing first trace records associated with the first process to the first trace output file;
fourth instructions for creating a second trace output file, wherein the second trace output file is associated with an operating system kernel;
fifth instructions for generating second trace records in response to events within the operating system kernel; and
sixth instructions for writing the second trace records associated with the operating system kernel to the second trace output file.

18. The computer program product of claim 17, wherein the first trace records are generated in response to events within the first process.

19. The computer program product of claim 17 further comprising:
seventh instructions for creating a third trace output file, wherein the third trace output file is associated with a second process, and wherein a file name of the third trace output file comprises the second process identifier;
eighth instructions for generating third trace records in response to events within the second process; and
ninth instructions for writing the third trace records associated with the second process to the third trace output file.

20. The computer program product of claim 19 wherein the first process and the second process execute concurrently.

21. The computer program product of claim 17 wherein the second process is a Java virtual machine.

22. The computer program product of claim 17, wherein the first trace records comprise the first process identifier.

23. The computer program product of claim 17 wherein the first process is a Java virtual machine.

24. The computer program product of claim 17 further comprising:
seventh instructions for merging execution statistics derived from the trace records associated with the first process with execution statistics derived from the second trace records associated with the operating system kernel.

* * * * *

UNITED STATES PATENT AND TRADEMARK OFFICE
CERTIFICATE OF CORRECTION

PATENT NO. : 6,754,890 B1
DATED : June 22, 2004
INVENTOR(S) : Berry et al.

It is certified that error appears in the above-identified patent and that said Letters Patent is hereby corrected as shown below:

Column 4,
Line 30, after "different" delete "sorces" and insert -- sources --.

Column 29,
Line 38, after "writing the" delete "bird" and insert -- third --.

Column 30,
Line 52, after "from the" insert -- first --.

Signed and Sealed this

Twenty-first Day of June, 2005

JON W. DUDAS
*Director of the United States Patent and Trademark Office*